US012149880B2

(12) United States Patent
Woelfl

(10) Patent No.: US 12,149,880 B2
(45) Date of Patent: Nov. 19, 2024

(54) TRANSDUCER ARRANGEMENTS FOR HEAD-AND EARPHONES

(71) Applicant: Genaro Woelfl, Salching (DE)

(72) Inventor: Genaro Woelfl, Salching (DE)

( * ) Notice: Subject to any disclaimer, the term of this patent is extended or adjusted under 35 U.S.C. 154(b) by 133 days.

(21) Appl. No.: 17/757,915

(22) PCT Filed: Jan. 8, 2021

(86) PCT No.: PCT/EP2021/050244
§ 371 (c)(1),
(2) Date: Jun. 23, 2022

(87) PCT Pub. No.: WO2021/140182
PCT Pub. Date: Jul. 15, 2021

(65) Prior Publication Data

US 2023/0061686 A1 Mar. 2, 2023

(30) Foreign Application Priority Data

Jan. 10, 2020 (DE) ......................... 102020000132.7

(51) Int. Cl.
*H04R 1/10* (2006.01)
*H04R 1/28* (2006.01)

(52) U.S. Cl.
CPC ......... *H04R 1/1075* (2013.01); *H04R 1/1008* (2013.01); *H04R 1/105* (2013.01); *H04R 1/2853* (2013.01); *H04R 2460/11* (2013.01)

(58) Field of Classification Search
CPC . H04R 1/00; H04R 1/008; H04R 1/10; H04R 1/105; H04R 1/1075; H04R 1/2853; H04R 1/2815; H04R 1/2819; H04R 1/2823; H04R 1/2826; H04R 1/2838; H04R 1/2842; H04R 1/2846; H04R 1/34; H04R 1/1008; H04R 2460/11; H04R 1/1066; H04R 1/1083; H04R 1/2857; H04R 1/406; H04R 3/005; H04R 2410/05; H04R 2430/23
USPC .......................................................... 381/370
See application file for complete search history.

(56) References Cited

U.S. PATENT DOCUMENTS

| | | | | |
|---|---|---|---|---|
| 5,821,471 | A | 10/1998 | McCuller | |
| 8,913,772 | B2 | 12/2014 | Yamaguchi | |
| 11,356,762 | B2 * | 6/2022 | Woelfl ................. | H04R 1/2807 |
| 2004/0264727 | A1 | 12/2004 | Kim | |
| 2009/0154755 | A1 | 6/2009 | Yamagishi | |
| 2012/0163649 | A1 | 6/2012 | Haapapuro et al. | |
| 2013/0266170 | A1 | 10/2013 | Ocharaku | |
| 2014/0056455 | A1 * | 2/2014 | Sakaguchi ............... | H04R 1/10<br>381/328 |
| 2015/0264467 | A1 | 9/2015 | Annunziato | |
| 2015/0382100 | A1 | 12/2015 | Azmi | |

(Continued)

*Primary Examiner* — Paul Kim
(74) *Attorney, Agent, or Firm* — WELSH FLAXMAN & GITLER LLC

(57) ABSTRACT

A transducer arrangement for head-or earphones including a sound steering unit, the sound steering unit includes a frontal chamber and at least one sound canal. Each of the at least one sound canals have at least one internal opening towards the frontal chamber and an external open end for directing sound towards the outside of the transducer arrangement. The transducer arrangement further includes a rear chamber and at least one loudspeaker arranged between the frontal chamber and the rear chamber.

32 Claims, 15 Drawing Sheets

(56) References Cited

U.S. PATENT DOCUMENTS

| | | | | |
|---|---|---|---|---|
| 2016/0192065 | A1 | 6/2016 | Oosato et al. | |
| 2017/0223443 | A1 | 8/2017 | Silvestri | |
| 2017/0230741 | A1 | 8/2017 | Matsuo et al. | |
| 2018/0054670 | A1 | 2/2018 | Struzik | |
| 2018/0190259 | A1 | 7/2018 | Woelfl et al. | |
| 2018/0288518 | A1* | 10/2018 | Schmidt ............... | H04R 1/1008 |
| 2019/0020946 | A1 | 1/2019 | Tu | |
| 2019/0253805 | A1* | 8/2019 | Wakeland ................ | H04R 7/18 |
| 2021/0067857 | A1* | 3/2021 | Struzik .................. | H04R 1/345 |

* cited by examiner

A-A'

TRANSDUCER ARRANGEMENTS FOR HEAD-AND EARPHONES

TECHNICAL FIELD

The disclosure relates to transducer arrangements for head- and earphones suitable for providing sound to an ear of a user without mechanically blocking ambient sound.

BACKGROUND

Traditional head- and earphones have reached a state where at least technically advanced products provide good sound quality. However, a growing number of headphone users turns away from traditional head- and earphone types, looking for better wearing comfort and uncompromised ambient sound perception. Open head- or earphones, which leave the ears largely open, are becoming increasingly popular despite substantially worse audio quality compared to their traditional counterparts. Especially bone conduction headphones are well established on the market although their sound quality is generally poor due to their working principle, which requires sound transmission through a user's body. This means that for a growing number of headphone users, the advantages of bone conduction headphones outweigh the huge loss in sound quality compared to traditional headphones. These advantages can mainly be seen in multiple aspects concerning wearing comfort and direct ambient sound perception. Nevertheless, besides audio quality issues, bone conduction headphones require tight mechanic coupling with the human body which demands relatively high contact force. Furthermore, vibrations applied to the body can be felt and are perceived as unpleasant by many users. Neck-speakers are another increasingly popular device category that supplies individual sound to a user without blocking the ears. Such devices, worn around the neck and resting on the shoulders, provide sound to the ears from a position below the ears. Besides a sound image from below and a lack in low frequency sound level, the main disadvantage of neck-speakers is sound leakage into the environment of a user. Therefore, such devices are merely appropriate for private listening. Open earphones with air-conducted sound are currently a niche product because they often suffer from poor ergonomics and low audio quality.

The invention provides transducer arrangements with closely linked geometric and acoustic characteristics that enable open head- and earphones, which combine good ergonomics with good sound quality while allowing for small and aesthetically pleasing design. Embodiments of the invention mitigate or avoid at least some of the key drawbacks of traditional ear- and headphones like pressure on parts of the outer ear including the ear-canal entry, heat buildup around the ear, moisture entrapped in the ear-canal, corrupted acoustic transfer function of pinna and ear-canal, blocked ambient sound as well as the occlusion effect.

Previously mentioned disadvantages of bone conduction headphones regarding contact pressure and vibration are also mitigated by embodiments of the invention. Furthermore, disadvantages coupled to the acoustically open design of open head- and earphones are minimized by certain embodiments of the invention. This concerns sound leakage to the environment as well as sound leakage into a voice pickup system which may be comprised in open head- or earphones. Furthermore, acoustic solutions provided by transducer arrangements according to the invention allow active noise cancellation for use cases where the otherwise uncompromised ambient sound perception would be a disadvantage.

SUMMARY

A transducer arrangement for head- or earphones includes a sound steering unit, which includes a frontal chamber and at least one sound canal. Each of the at least one sound canal includes at least one internal opening towards the frontal chamber and an external open end for directing sound towards the outside of the transducer arrangement. The transducer arrangement further includes a rear chamber and at least one loudspeaker arranged between the frontal chamber and the rear chamber.

An earphone includes a transducer arrangement. The transducer arrangement includes a sound steering unit, which includes a frontal chamber and at least one sound canal. Each of the at least one sound canal includes at least one internal opening towards the frontal chamber and an external open end for directing sound towards the outside of the transducer arrangement. The transducer arrangement further includes a rear chamber and at least one loudspeaker arranged between the frontal chamber and the rear chamber. At least wall sections of the rear chamber and wall sections of the sound steering unit form a main body with a protruding nozzle. The main body comprises a support surface arranged and constructed to rest on the cheek of a user directly in front of at least part of the ear. Wall sections of the nozzle run side by side with wall sections of the main body, thereby creating a tragus gap between the main body and the nozzle. The tragus gap provides free space for the tragus of the ear of the user.

A method for providing sound to an open ear of a user, the method includes operating at least one loudspeaker, wherein the at least one loudspeaker is included within a transducer arrangement. The transducer arrangement includes a sound steering unit, which includes a frontal chamber and at least one sound canal. Each of the at least one sound canal includes at least one internal opening towards the frontal chamber and an external open end for directing sound towards the outside of the transducer arrangement. The transducer arrangement further includes a rear chamber and at least one loudspeaker arranged between the frontal chamber and the rear chamber. At least wall sections of the rear chamber and wall sections of the sound steering unit form a main body with a protruding nozzle. The main body comprises a support surface arranged and constructed to rest on the cheek of a user directly in front of at least part of the ear. Wall sections of the nozzle run side by side with wall sections of the main body, thereby creating a tragus gap between the main body and the nozzle. The tragus gap provides free space for the tragus of the ear of the user.

Other arrangements, devices, systems, methods, features and advantages will be or will become apparent to one with skill in the art upon examination of the following detailed description and Figures. It is intended that all such additional arrangements, devices, systems, methods, features and advantages be included within this description, be within the scope of the invention and be protected by the following claims.

BRIEF DESCRIPTION OF THE DRAWINGS

The invention may be better understood with reference to the following description and drawings. The components in the Figures are not necessarily to scale, emphasis instead being placed upon illustrating the principles of the invention. Moreover, in the Figures, like referenced numerals designate corresponding parts throughout the different views.

DETAILED DESCRIPTION

Figure 1:
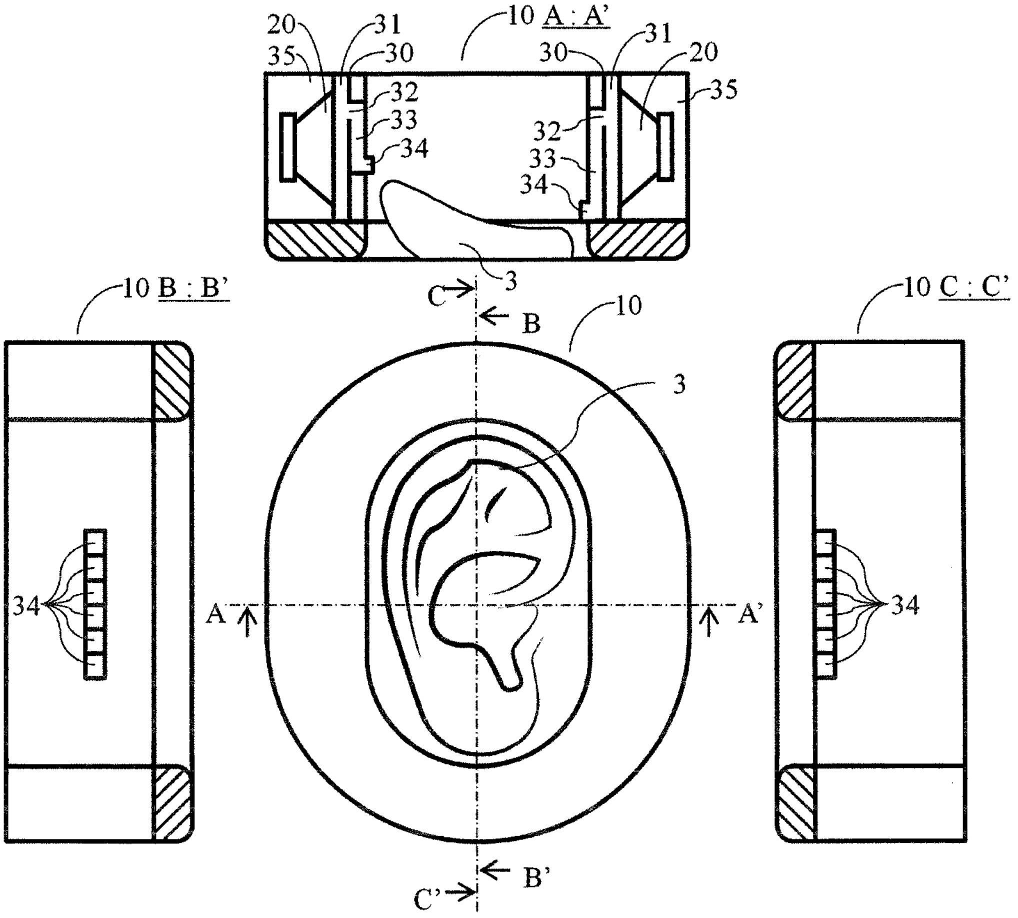
FIG. 1 schematically illustrates different views of an ear-cup of a headphone comprising exemplary transducer arrangements with sound steering unit

An open headphone may, for example, comprise multiple loudspeakers 20 as shown in the schematic illustrations of FIG. 1. In FIG. 1, an illustration of an ear-cup 10 of an open headphone is shown. The ear-cup 10 encircles an outer ear or pinna 3 and comprises one loudspeaker 20 in front of the pinna 3 and one loudspeaker 20 behind the pinna 3. In front of the membrane of each of the loudspeakers 20, shown in cross sectional view A:A', is a sound steering unit 30 comprising a frontal chamber 31, at least one internal opening 32 and at least one sound canal 33 with an external opening 34. In the example of FIG. 1, loudspeakers 20 are arranged between the respective frontal chamber 31 and a rear chamber 35 for each loudspeaker 20. In addition to the open construction, that keeps the ears largely open, the ear-cup 10 shown in FIG. 1 is designed to induce natural directional pinna cues. Natural directional pinna cues relate to acoustic reflection, refraction and resonance effects in the pinna 3 that are stimulated by sound hitting the pinna 3 from certain directions. These pinna resonances cause frequency-dependent amplification and cancellation patterns on the incoming sound that are distinct for any direction of sound arrival at the pinna 3. These pinna-related transfer functions are unique for every human and are utilized by the human auditory system as directional cues for localization of sound sources. With controlled induction of natural directional pinna cues, it is possible to synthesize virtual sound sources that are perceived by a listener at specific positions with respect to the head. Such binaural synthesis methods may require additional signal processing techniques in combination with controlled induction of natural directional pinna cues. Pinna resonances that result in distinct directional cues are excited if the pinna 3 is subjected to a direct, approximately unidirectional sound field from the desired direction.

Figure 2:
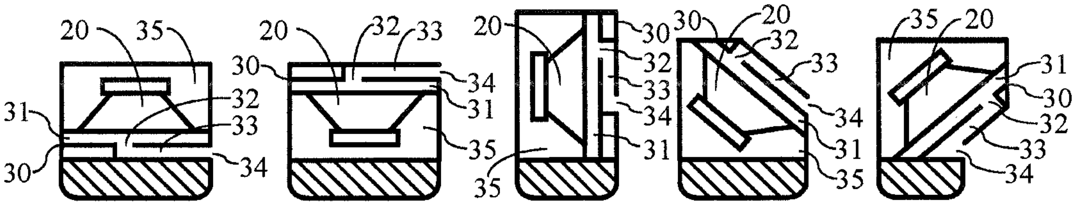
FIG. 2 shows schematic illustrations of exemplary transducer arrangements with sound steering unit FIG. 3 schematically illustrates various examples of ear-cups for headphones comprising transducer arrangements with sound steering unit
Figure 3:
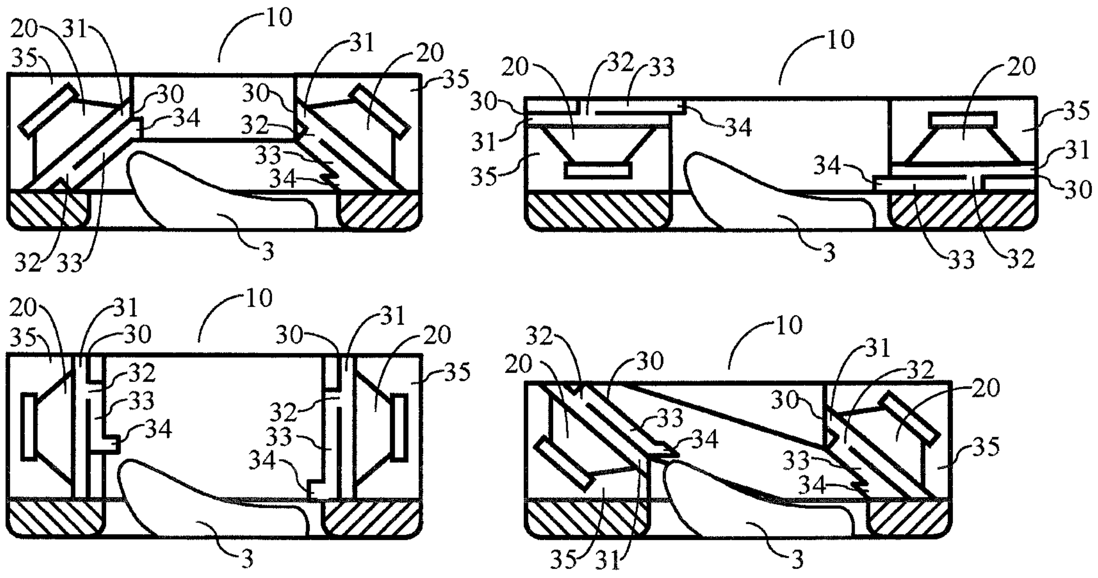

Sound steering units 30, applied to an ear-cup 10 of a headphone as illustrated by FIGS. 1-3, allow control of the direction of sound arrival at the pinna 3 at least for the direct path from the external opening 34 of the at least one sound canal to the pinna 3. If not avoided by suitable measures, indirect sound reflected by parts of the headphone construction towards the pinna 3 may arrive at the pinna 3 from different directions than direct sound. Therefore, additional measures may be taken to minimize reflections within an open ear-cup 10. In the cross-sectional views B:B' and C:C' of the open ear-cup 10 of FIG. 1, six adjacent external openings 34 per sound steering unit 30 are shown. When the ear-cup 10 of FIG. 1 is arranged around the pinna 3 of a user, six external openings 34 are arranged in front of the pinna 3 and six external openings 34 are arranged behind the pinna 3. Transducer arrangements shown in FIG. 2 in a simplified cross-sectional view each comprise a loudspeaker 20 and a sound steering unit 30 in front of the loudspeaker membrane comprising a frontal chamber 31, at least one internal opening 32 and at least one sound canal 33 with an external opening 34 and may, for example, be applied in ear-cups 10 of open headphones as shown in FIGS. 1 and 3. A sound steering unit 30 in front of the membrane of a loudspeaker 20 controls the incidence direction of direct sound at the pinna 3 as can be seen in FIGS. 1 and 3. The positions of the external openings 34 with respect to the pinna 3 control the direction of sound arrival at the pinna 3. FIG. 3 illustrate possible integration of transducer arrangements with sound steering unit 30 according to FIG. 2 to open ear-cups 10, each of four integration examples shown in a simplified cross-sectional view. In practical implementations the loudspeaker membrane and therefore also the volume within the frontal chamber 31 in front of the loudspeaker membrane may be of considerable size compared to the wavelength of a higher frequency part of the frequency spectrum radiated by the loudspeaker 20.

Figure 4A:
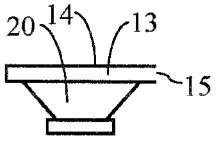
FIG. 4A shows a transducer arrangement with waveguide and FIGS. 4B and 4C schematically illustrate transducer arrangements, each comprising an exemplary sound steering unit FIGS. 5A to 5C schematically illustrate various exemplary transducer arrangements with sound steering unit FIG. 6 schematically illustrates an exemplary transducer arrangement with sound steering unit in different views FIG. 7 schematically illustrates the sound steering unit of the transducer arrangement of FIG. 6 in different views

Pinna resonances occur above 2-4 kHz and are effective up to at least 15 kHz. Within this frequency range, resonance and cancellation effects that may occur within the frontal chamber 31, can be detrimental to the induction of natural directional pinna cues. One aim of the invention is the reduction of resonance and cancellation effects within the acoustic arrangement utilized for sound steering in open head- and earphones. One cancellation or comb filter effect that occurs for waveguides 14, as shown in FIG. 4A, is caused by reflections inside the waveguide 14. Sound radiated by the loudspeaker membrane is reflected by walls of the waveguide 14. At a waveguide output 15, reflected and therefore delayed sound interferes with direct radiated sound from the loudspeaker 20. This can cause deep notches in the magnitude response of the waveguide 14 similar to a comb filter. Depending on the dimensions of the waveguide 14, one or more notches may fall into the frequency range between 4 kHz and 15 kHz and resemble typical pinna cues. FIG. 4A shows a cross section of a loudspeaker arrangement with waveguide 14. The waveguide 14 comprises a cavity 13 with a loudspeaker 20 arranged in wall portions of the cavity 13 and at last one opening of the cavity 13 which forms the waveguide output 15.

Figure 4B:
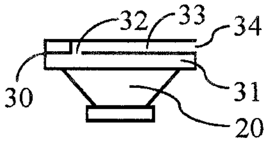

In order to reduce previously described cancellation or comb filter effects that may occur for waveguides 14, the sound steering unit 30 as, for example, shown in FIG. 4B may be utilized, that allows spatial averaging of the sound field in front of at least one loudspeaker 20 by means of a multitude of sound canals 33 and/or a multitude of internal openings 32. Sound steering unit 30, illustrated in a cross-sectional view in FIG. 4B, comprises a frontal chamber 31 in front of the loudspeaker membrane of loudspeaker 20 and a number of sound canals 33. Each sound canal 33 comprises at least one internal opening 32 towards the frontal chamber 31 in front of the loudspeaker 20 and either individual or combined (with additional sound canals 33) external openings 34 towards the outside of a transducer arrangement comprising the sound steering unit 30. Over at least part of their length, sound canals 33 may run in parallel to wall sections of the frontal chamber 31. Wall sections of the frontal chamber 31 may separate at least a part or a section of each sound canal 33 from the frontal chamber 31.

Figure 4C:
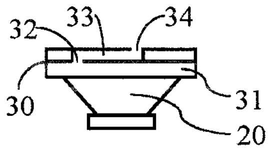

One sound canal 33 of a sound steering unit 30 is shown in the cross sectional view of FIG. 4B. The sound canal 33 comprises an inner or internal opening 32 towards the frontal chamber 31 in front of the loudspeaker 20, a tubular section and an external opening or open end 34, which steers sound towards the outside of the transducer arrangement. The tubular section runs side-by-side with the frontal chamber 31 with a common wall section separating the frontal chamber 31 from the tubular section of the sound canal 33. An opening within the common wall section constitutes the internal opening of sound canal 33 towards the frontal chamber 31. Sound canal 33 runs in parallel to wall sections of the frontal chamber 31. This arrangement of the sound canals 33 enables the combination of a compact shape of the sound steering unit 30 as well as a small frontal chamber 31 with multiple sound canals 33 of variable length. A length variation range of the sound canals 33 is provided by the geometric extension of wall sections of the frontal chamber 31. Therefore, the frontal chamber 31 merely requires one dimension that can cover a desired length variation range. Other dimensions of the frontal chamber 31 may be chosen such that the internal volume of the frontal chamber 31 is small. The external opening or external open end 34 of the sound canal 33 may either be right at the transition towards the outside of the transducer arrangement or the sound canal 33 may end in a small, partly enclosed volume with a nearby opening towards the outside. In that sense, the external open end 34 of the sound canal 33 does not necessarily release sound directly towards the outside of the transducer arrangement but may in some cases steer sound towards the outside by steering it into a small enclosed volume with an opening to the outside. The term "open end" shall emphasize, that the individual sound canal 33 ends at this point, whereas an opening may be arranged anywhere along the longitudinal axis of a sound canal 33. Multiple sound canals 33 may end in a small, enclosed volume with an opening towards the outside. In any case an external open end 34 or external opening 34 of any sound canal 33 is in fluid communication with the outside of the transducer arrangement. More examples will be given in the following, e.g. with reference to FIG. 27. FIG. 4C illustrates another transducer arrangement with an exemplary sound steering unit 30 in front of the membrane of a loudspeaker 20. The sound steering unit 30 of FIG. 4C shows an internal opening 32 towards a sound canal 33 with an external opening 34. The external opening 34 shown in FIG. 4C is arranged in parallel to the longitudinal axis of the sound canal 33 and opens towards a direction perpendicular to the longitudinal axis of the sound canal 33. In FIG. 4B, the external opening 34 is arranged perpendicular to the longitudinal axis of the sound canal 33 and opens in a direction parallel to the longitudinal axis of the sound canal 33.

Figure 5A:
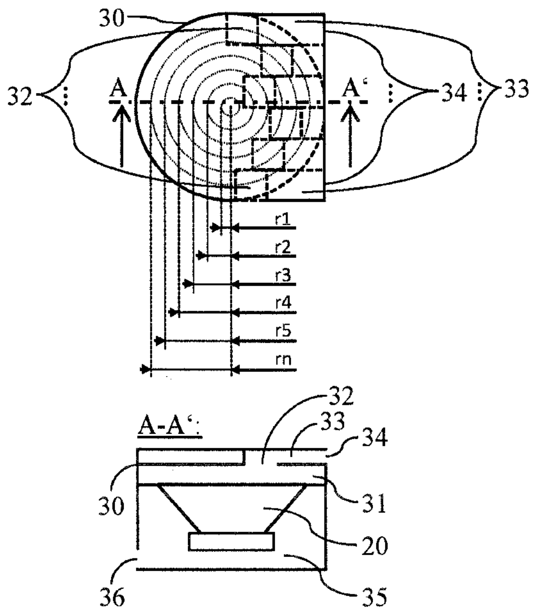
Figure 5B:
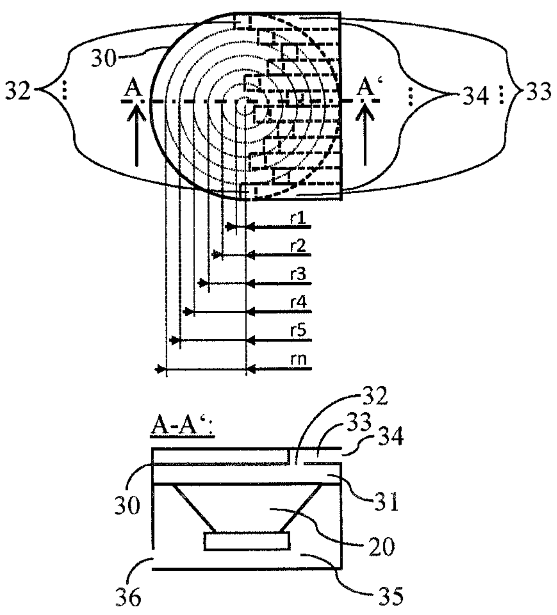
Figure 5C:
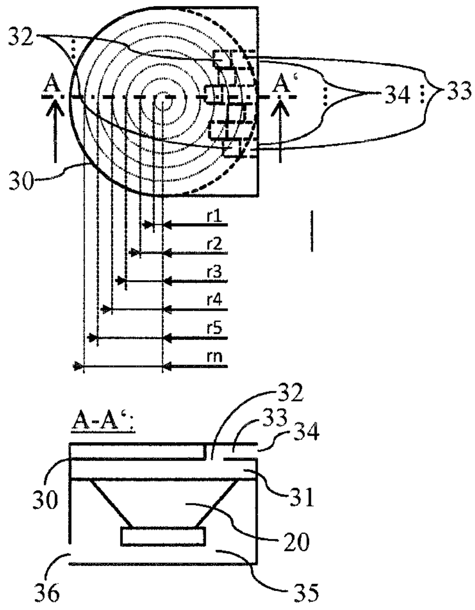

In order to allow spatial averaging of the sound field in front of the loudspeaker 20 within the frontal chamber 31, a sound steering unit 30 may comprise a multitude of sound canals 33 as shown in FIG. 5. FIG. 5 illustrate exemplary transducer arrangements with sound steering units 30 comprising 6 (FIGS. 5A and 5C) or 12 (FIG. 5B) sound canals 33 respectively. In FIGS. 5, the loudspeaker 20, including the loudspeaker membrane, as well as the frontal chamber 31 exhibit a circular shape. Therefore, the sound field within the frontal chamber 31 may be approximately equal along concentric circles, which are exemplary shown as dotted line circles with radii r1 to rn in FIG. 5. Spatial averaging of the sound field within the frontal chamber 31 by a multitude of sound canals 33 can be achieved, if the internal openings 32 of the respective sound canals 33 are located on different concentric circles. Thereby each internal opening 32 of the sound canals 33 towards the frontal chamber 31 samples the sound field at an individual location with respect to the membrane of the loudspeaker 20 and the walls of the frontal chamber 31. In front of the external openings 34 towards the outside of the transducer arrangement, the sound of all sound canals 33 is superimposed, thereby providing a positional averaged version of the sampled sound field within the frontal chamber 31. Positional averaging may therefore reduce the effect of reflection-based cancellation and standing waves inside the frontal chamber 31 on the combined sound of the external openings 34. For good positional averaging of the sound field in front of the loudspeaker 20, at least 3 internal sound canal openings 32 may be provided by at least one sound canal 33. As an alternative to multiple sound canals 33, a single sound canal 33 may comprise multiple internal openings 32 towards the frontal chamber 31 that sample the sound field within the frontal chamber 31 at different positions.

Besides individual positioning of the internal openings 32 of the sound canals 33 in FIGS. 5, all sound canals 33 of each respective transducer arrangement shown also comprise different lengths. Depending on the absolute lengths of the sound canals 33, this may provide further advantages as will be detailed below. In some cases it may, however, be desirable that some or all sound canals 33 have the same length. This may for example be the case if sound canal length is so short that tube resonances, which may develop in sound canals 33, are above the audible frequency range or at least above 15 kHz. It should be understood, that the illustrations of FIG. 5 are meant to show the principles of sound steering units 30 with spatial averaging. Spatially diverse positions may also be found in frontal chambers 31 of different shape like for example rectangular, square, elliptic or any irregular shape. Furthermore, sound canal openings (32, 34) may have any shape including but not limited to rectangular, square, elliptic or any irregular shape. Internal openings 32 of sound canals 33 may be arranged within one plane in front of the membrane of at least one loudspeaker 20 comprised in the transducer arrangement like shown in FIG. 5. Alternatively or additionally internal openings 32 of sound canals 33 may be arranged at equal distance from the membrane of at least one loudspeaker 20 comprised in the transducer arrangement. In case the loudspeaker membrane exhibits a certain variable height profile, as is for example the case for a conical or dome shaped membrane, the internal openings 32 of sound canals 33 may be distributed over a surface that is at least partly parallel to the loudspeaker membrane in order to keep equal distance from the membrane.

Certain length variations of sound canals 33 may be advantageous for the proposed sound steering units 30 but are not required if merely spatial averaging of the sound field in front of the loudspeaker membrane shall be achieved. Sound canals 33 may comprise smooth edges without any sharp corners or exhibit distinct corners like shown in FIG. 5. Distinct corners as well as internal openings 32 of sound canals 33 towards a direction perpendicular to the longitudinal axis of the respective sound canal 33, at least in the region of the internal opening 32, may reduce resonance effects within sound canals 33 at a higher frequency range or at a higher tube resonance order because the effective length of the sound canal 33 varies over the cross section area of the sound canal 33. Transducer arrangements comprising sound steering units 30 as illustrated by FIG. 5 may be applied in ear-cups 10 of open headphones, for example ear-cups 10 as illustrated in FIGS. 1 and 3. Transducer arrangements as shown in FIG. 5 may also be applied in closed ear-cups utilized for controlled acoustic induction of natural directional pinna cues. For the integration to head- or earphones the transducer arrangement may comprise a rear chamber 35 around one side (e.g. the rear side) of the at least one loudspeaker 20 as shown in FIGS. 5A to 5C. The rear chamber 35 may either be fully closed or ventilated, for example by one or more rear ventilation openings 36.

Sound steering units 30 with either a single sound canal 33 or multiple sound canals 33 may also be applied in open earphones. In contrast to open headphones, where sound from the transducer arrangements is released at positions around the ears 3 of a user, sound steering units 30 of open earphones, according to the invention, release sound within at least one of the cavities of the outer ear 3. Open earphones according to the invention may for example release sound close to the entry of the external auditory meatus 307 (ear-canal entry). Open earphones according to the invention are open in the sense, that the auditory meatus 307 is at least not blocked completely by the earphone. Therefore, ambient sound may enter the ear canal and good ventilation of the ear canal is ensured. In one embodiment, the complete frequency spectrum provided by the earphone is transferred through the sound steering unit 30 and radiated close to the ear canal entry 307 if the transducer arrangement is attached to the outer ear 3 of a user. Hybrids between open earphones and open headphones (hybrid phones) are also possible which do provide only part of the sound, for example a certain frequency range, over a sound steering unit 30 releasing sound close to the ear canal entry 307. Another frequency range of the sound provided by hybrid phones may be provided by transducer arrangements that release sound at any position around the ear 3 of a user.

Figure 6:
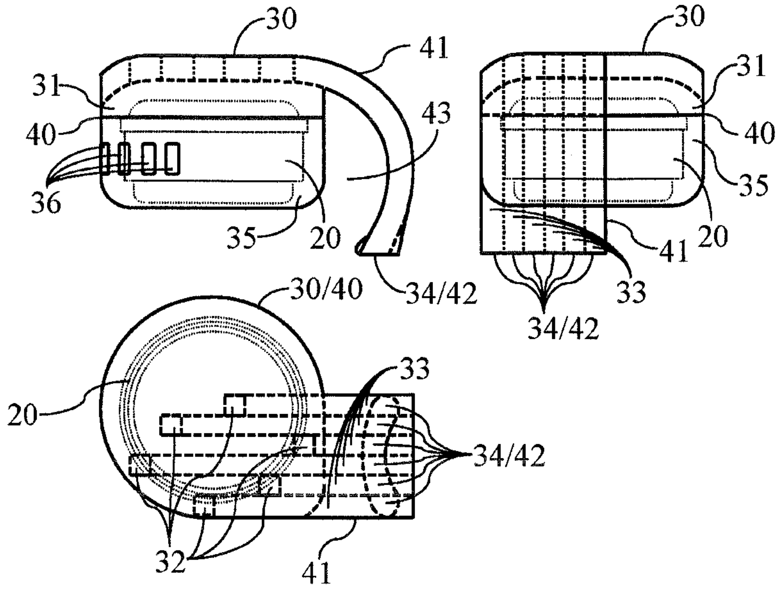

An example of a transducer arrangement for an open earphone according to the invention is illustrated by FIG. 6. The transducer arrangement comprises a loudspeaker 20 with circular membrane within a rear chamber 35 with rear ventilation openings 36 and a sound steering unit 30 connected to the front of the loudspeaker 20 (in front of the frontal side of the loudspeaker membrane). The sound steering unit 30 controls the direction of sound radiation from the frontal side of the membrane of the loudspeaker 20 towards the outside of the transducer arrangement. While the front of the loudspeaker 20 radiates sound essentially towards the top in FIG. 6, the sound steering unit 30 radiates sound towards the bottom as shown in FIG. 6. This means that the main direction of sound radiation from the frontal side of the loudspeaker 20 is approximately inversed by the sound steering unit 30. The loudspeaker membrane may alternatively exhibit any shape like oval, oblong (e.g. racetrack geometry), square or rectangular. Rear ventilation openings 36 of the rear chamber 35 are illustrated as essentially rectangular slots in parts of the wall of the rear chamber 35. While ventilation of the rear chamber 35 is optional, ventilation may for example also comprise waveguides or ducts. Six sound canals 33 sample sound (receive sound) with respective internal openings 32 (sound inputs) in front of the membrane of the loudspeaker 20 at individual positions. Each sound canal 33 has an individual length. Sound canals 33 run side by side and essentially in parallel over the longest part of their axial length and end with adjacent external openings or external open ends 34 (sound outputs) towards the outside of the transducer arrangement. Wall sections of the frontal chamber 31 separate the frontal chamber 31 from sections of the sound canals 33 which run in parallel to these common wall sections. Openings within these common wall sections between a section of each respective sound canal 33 and the frontal chamber 31 constitute the internal openings 32 of the respective sound canals 33. External walls of the rear chamber 35 and of the sound steering unit 30 form a main body 40 with a protruding nozzle 41 if the transducer arrangement of FIG. 6 is viewed as a geometrical entity. Sections of the nozzle 41 run side by side with sections of the main body 40, such that a tragus gap 43 between the main body 40 and the nozzle 41 is created. The tragus gap 43 providing free space for the tragus 301 of an ear 3 in order to avoid mechanical stress on the tragus 301. The nozzle 41 comprises parts of the sound canals 33 of the sound steering unit 30. A nozzle cross section area orthogonal to the longitudinal axis of the nozzle 41 may have an essentially oblong or elongated shape.

Figure 7:
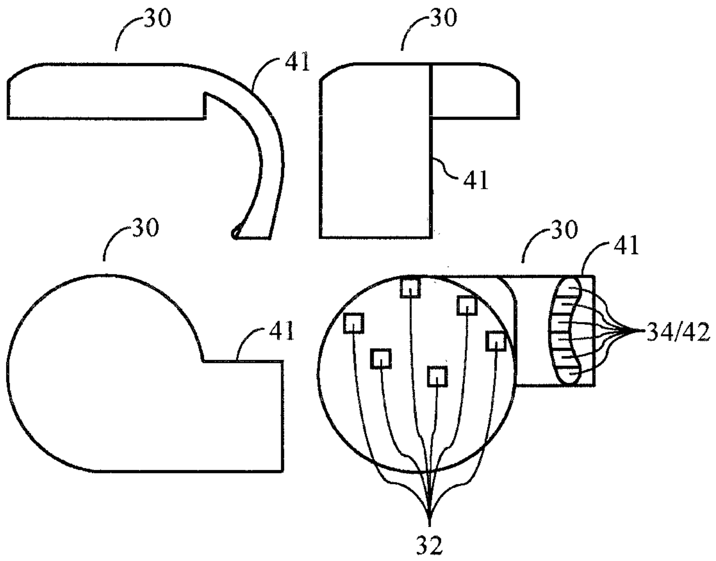

The sound steering unit 30 of the transducer arrangement of FIG. 6 is separately illustrated by FIG. 7, which may help to understand which part of the transducer arrangement is referred as sound steering unit 30. The term "unit" as part of the term "sound steering unit" is not meant to limit any practical implementation of a sound steering unit 30. A transducer assembly may comprise various mechanical parts. Some or all of these mechanical parts may jointly provide characteristic features of a sound steering unit 30 as described herein. For example, part of the wall sections of a frontal chamber 31 may constitute part of the sound steering unit 30 and may be part of a mechanical component also providing a rear chamber 35. An actual sound steering unit 30 may comprise several mechanical components that may be permanently or detachably assembled. FIG. 7 shows the respective internal opening 32 and external opening 34 of each individual sound canal 33 running between aforementioned openings. The view from the bottom side at the lower right part of FIG. 7 shows the adjacent external openings 34 of the sound canals 33. The latter constitute the previously mentioned oblong or elongated shape of the nozzle cross section area. In order to provide size adaption for various ears, the sound steering unit 30, or parts thereof, for example the nozzle, may be exchangeable by a user of an earphone comprising a transducer arrangement in accordance with the invention and various sizes and shapes of the nozzle 41 may be provided to the user. This may allow the adaption of the general shape, the width wn and the thickness to of the nozzle 41 as well as the width dt of the tragus gap 43. Furthermore, the nozzle 41 may comprise at least one rigid material and alternatively or additionally an elastic material (e. g. silicone). The latter may improve wearing comfort. For example, the nozzle 41 may comprise a first part that is rigid and coupled to the main body 40 and/or the frontal chamber 31. A second part of the nozzle 41 may be detachably connected to the first part of the nozzle 41. The second part of the nozzle 41 may comprise an elastic material. The sound canals 33 may be partly or completely comprised in the second part of the nozzle 41.

Figure 8:
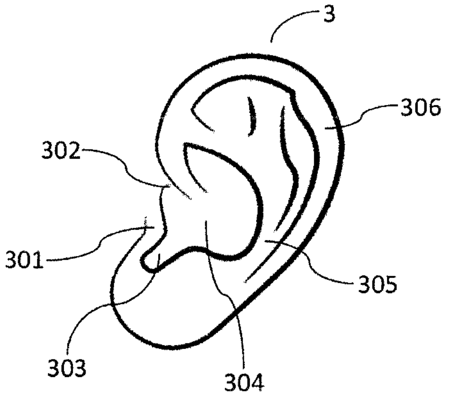
FIG. 8 is a drawing of an outer ear FIG. 9 schematically illustrates an exemplary earphone mounted on an ear FIG. 10 schematically illustrates an exemplary transducer arrangement and parts of an outer ear in a cross-sectional view FIG. 11 schematically illustrates relative alignment of parts of a transducer arrangement FIG. 12 schematically illustrates a stereo set of earphones with a neckband FIG. 13 schematically illustrates earphones with neckband on the head of a user FIG. 14 schematically illustrates earphones with neckband on ears of different size FIGS. 15A and 15B schematically illustrate adjustment of a transducer arrangement with pivot mechanism FIG. 16 schematically illustrates a tragus alignment section of a sound steering unit FIG. 17 schematically illustrates adjustment of a tragus gap by means of size adjustment of an external tragus alignment section FIG. 18 schematically illustrates exemplary oblong or elongated cross sectional shapes FIG. 19 schematically illustrates various examples of sound steering units FIG. 20 schematically illustrates various examples of sound steering units FIGS. 21A and 21B schematically illustrate geometric features of exemplary sound steering units
Figure 9:
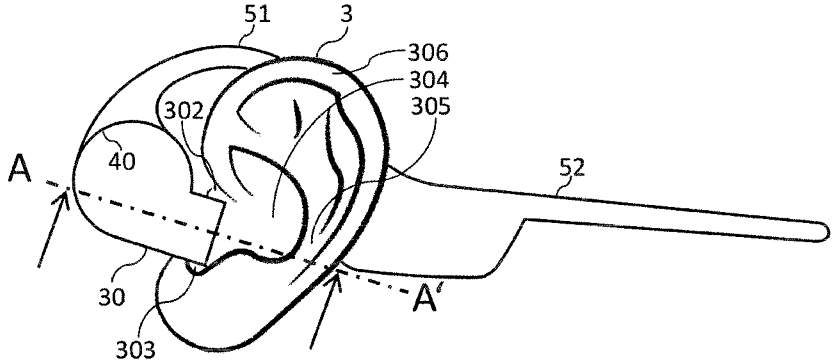

FIG. 8 specifies regions of the outer ear or pinna 3 as referenced in the following descriptions. These regions include the tragus 301, which sits between the anterior notch 302 and the intertragal notch 303. The concha 304 is a cavity between the tragus 301 and the anti-helix, which leads to the external auditory meatus 307 (shown in FIG. 10). The helix 306 is the prominent rim of the auricle which extends along the upper rear part of the outer ear 3. The transducer arrangement of FIG. 7 may for example be secured at the ear 3 of a user by a support structure like, for example, a neckband 52 with an ear-hook 51 as illustrated by FIG. 9, showing a complete earphone. Thereby, the transducer arrangement is mainly arranged in front of the pinna 3 with the sound steering unit 30 protruding over the tragus 301 towards the external auditory meatus 307 (ear canal entry). The main body 40 is substantially smaller than the ear 3 and positioned directly in front of the ear 3 as well as the tragus 301 (tragus 301 not shown in FIG. 9 because it is covered by transducer arrangement). Wall sections of the rear chamber 35 provide a support surface, that rests on the cheek of a user in front of the ear 3. The nozzle 41 of the sound steering unit 30 may enter the region surrounded by the pinna 3 of a user between the anterior notch 302 and the intertragal notch 303, covering at least parts of the tragus 301 and potentially at least parts of one or both notches when viewed from a lateral direction like in FIG. 9.

Figure 10:
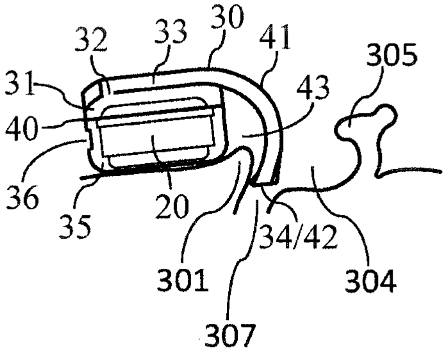

As illustrated in the cross-sectional view of FIG. 10, which shows a cross section between A and A' in FIG. 9, the nozzle 41 of the sound steering unit 30 may end above (as shown in FIG. 10) the external auditory meatus 307 (also referenced as ear canal entry 307), or, in other words, laterally directly adjacent thereto, which means the same with reference to the head of a user, thereby keeping the ear canal entry 307 open for ambient sound and ventilation. The main direction of sound radiation from the frontal side of the loudspeaker 20 is approximately inversed by the sound steering unit 30. While the frontal side of the loudspeaker 20 radiates sound in a lateral direction away from the head of a user, the sound steering unit 30 radiates sound from a position laterally adjacent to the ear canal entry 307 towards the ear canal entry 307. Due to the tragus gap 43, the lateral extremes of the tragus 301 are not touched by the nozzle 41 or any other part of the transducer arrangement. This keeps the lateral extremes of the tragus 301 free of lateral forces, which may, for example, be applied to the main body 40 and clamp it against the cheek of a user. The oblong or elongated shape of the nozzle cross section area orthogonal to the longitudinal axis of the nozzle 41, allows the nozzle 41 to run close to the tragus 301 without protruding far towards the direction of the center of the concha 304 or antihelix 305. The pinna 3 is therefore largely unobstructed by the transducer arrangement and most of the concha 304 can be viewed from a lateral direction. This keeps the pinna transfer function largely intact for ambient sounds providing excellent ambient sound localization. Another important aspect of the slim nozzle 41 with sound output positioned close to the tragus 301 is that the sound radiated at the nozzle output 42 will partly hit the rear wall of the tragus 301 and reflect back to the ear canal entry 307. At the ear canal entry 307 direct and reflected sound mix, which results in frequency-dependent cancellation and amplification effects similar to the case where sound reaches the ear 3 from a frontal direction. Thereby, an acoustic directional cue for a frontal sound source direction is imposed on the sound. The directional cue is individual for the user as it depends on the geometry of the user's ear 3. This frontal cue provides a frontal bias for a perceived sound image when listening with earphones comprising the proposed transducer arrangement. If the sound image is externalized by suitable methods, like for example side to side crossfeed of a stereo signal with the application of interaural level and time differences, the perceived sound image tends to be in front of the user instead of the sides or even the back. This provides a more natural listening experience than a sound image on the sides or back of the head.

Figure 11:
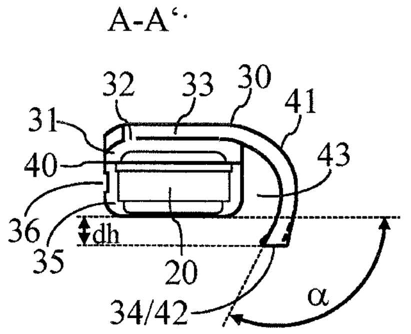

As illustrated in the cross sectional view of FIG. 11, which shows a cross section between A and A' of the transducer arrangement of FIG. 9, the nozzle 41 may end below a support surface of the main body 40 that is intended to rest on the cheek of a user directly in front of the pinna 3. The support surface is created by wall sections of the rear chamber 35 that are part of the main body 40. Between a plane containing the support surface and the nozzle output 42 of the nozzle 41, a perpendicular distance dh may be between 1 mm and 8 mm. The nozzle 41 ends below the plane which means that the nozzle 41 intersects with the plane containing the support surface. For the nozzle 41 to align well with the side of the tragus 301 that is oriented towards the area of the concha 304, an angle α between the plane containing the support surface and a wall section of the nozzle 41 below the plane may be between 90° and 130°. The nozzle 41 resting on the tragus 301 close to the ear canal entry (see FIG. 11) may help to secure the transducer arrangement on the ear 3 of a user. The cross section area of the nozzle output 42, which may in some cases coincide with the external open ends 34 of the sound canals 33, may fall within a plane, which is approximately parallel to the plane containing the support surface. An angle between these two planes may be less than 15° or less than 10° (planes are parallel in FIG. 11, angle not shown). This orientation of the nozzle output 42 provides good acoustic coupling between the nozzle 41 and the ear canal entry 307. Furthermore, especially for a higher frequency range, less acoustic signal components may be emitted towards the concha 304, thereby providing sound without distinct directional pinna cues (refer to previous discussion on pinna cues). This can be beneficial for binaural synthesis of virtual sound sources for spatial 2D or 3D audio rendering.

Figure 12:
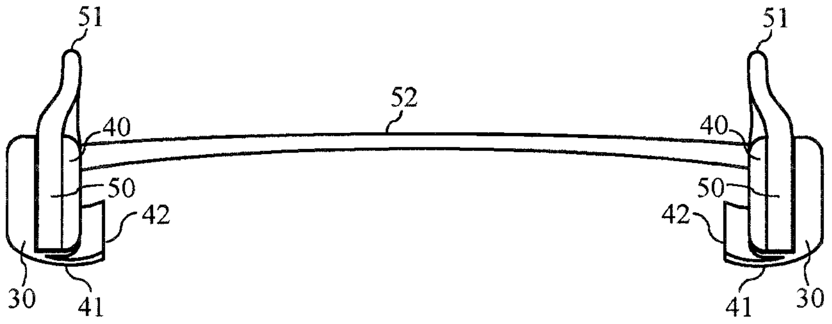
Figure 13:
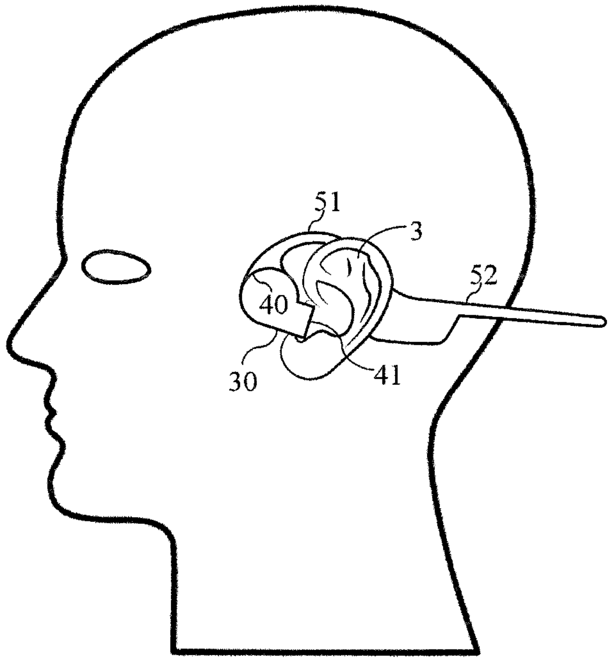

A support structure that secures a stereo set of transducer arrangements of open earphones on the ears 3 and head of a user may, for example, be shaped as illustrated in FIGS. 12 and 13. The support structure shown in these Figures comprises ear-hooks 51 and a neckband 52. Ear-hooks 51 comprise a substantially U-shaped arch that encircles the upper part of the respective pinna 3 as shown in FIG. 13. The support structure may comprise flexible material and additionally or solely a spring wire or other elastic material that applies a small relative clamping force to the main bodies 40 of the transducer arrangements that pushes the support surface of the respective transducer arrangement softly against the cheeks of the user. Despite relatively low clamping forces, any mechanical pressure applied laterally to the extremes of the tragus 301 may cause discomfort for a user. As previously described, the tragus gap 43 may therefore keep the tragus 301 free of lateral forces supplied by the support structure. One advantage of air-transmitted (or airborne) sound, as employed by transducer arrangements of open earphones according to the invention, compared to bone conduction headphones, is the lower clamping force required. Bone conduction headphones mainly conduct sound through skin, flesh, cartilages and bones, which requires high clamping force for good mechanical coupling in order to transmit sound vibration into the body of a user. This is not required for air-transmitted (or airborne) sound.

Especially in combination with ear-hooks 51, as integrated to the support structure shown in FIGS. 12 and 13, clamping force between left and right side earphone can be reduced to a minimum with the proposed transducer arrangement, which improves long term wearing comfort. Another reason for minimum required contact forces to the human body is that open earphones do not require any sealing around the ear 3 or ear canal entry 307, as would be required for standard head- or earphones. The neckband 52 in FIG. 12 is shown in a tensioned state, as would be the case if the neckband 52 were worn on the head of a user as illustrated in FIG. 13. Alternatively, a neckband 52 without clamping force may be utilized because ear-hooks 51 alone may provide sufficient support. Such a neckband 52 could for example be adjustable in order to allow fitting to different head sizes. The earphones in FIG. 12 are shown from a frontal viewing angle with respect to the head of FIG. 13. The head is not included in FIG. 12 to show the complete neckband 52 and nozzles 41 of the earphones which would otherwise be covered by the head and pinnae 3 respectively.

The support structure may comprise ear-hooks 51, shaped to be arranged around parts of the pinna 3, at least partly running between the head of a users and the helix 306 of the user's ear 3, like shown in FIG. 13. As previously stated, an ear-hook 51 may comprise a substantially U-shaped arch that encircles an upper part of a user's pinna 3. The ear-hook 51 in FIGS. 12 and 13 mechanically connects to the transducer arrangement and to a neckband 52 that runs around the neck or back of the head. Alternatively, an ear-hook 51 without the neckband 52 may be utilized to secure one open earphone or transducer arrangement to one ear 3. Optionally a cable may connect a stereo set of earphones with ear-hooks 51.

Figure 14:
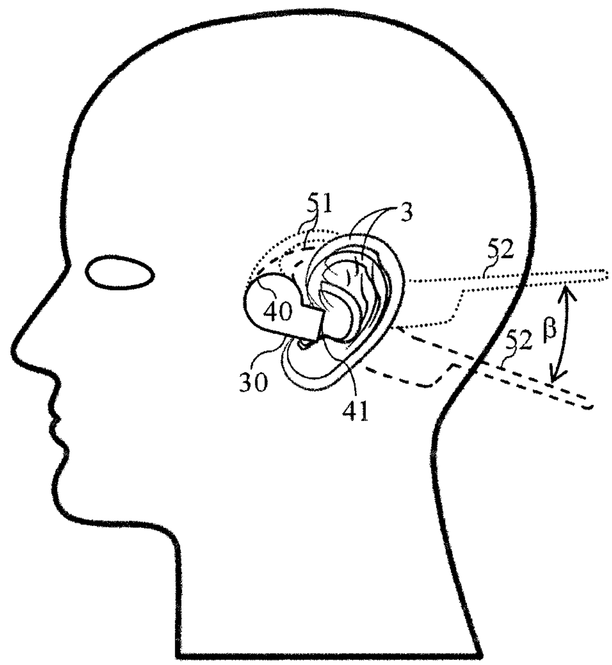

Depending on shape and size of the pinna 3 of a user as well as the ear-hook 51, the latter may rest on various parts of the pinna 3. For a given shape and size of an ear-hook 51, this may result in different orientation of the ear-hook 51 with respect to the pinna 3. The ear-hook 51 may essentially rotate around the pinna 3 and/or around an axis crossing both ears or similar points in front of both respective ears like shown in FIG. 14 on the example of a small and a large ear 3. In the illustration of FIG. 14 the ear-hook 51 is attached to a neckband 52 and therefore the orientation of the neckband 52 changes with the rotation of the ear-hook 51. As shown in FIGS. 9 and 10, the nozzle 41 is intended to be aligned with the tragus 301. While this still allows for some rotation of the transducer arrangement without adverse effects on ergonomics or sound, it is desirable to avoid large rotations of the nozzle 41 within the concha 304.

Figure 15A:
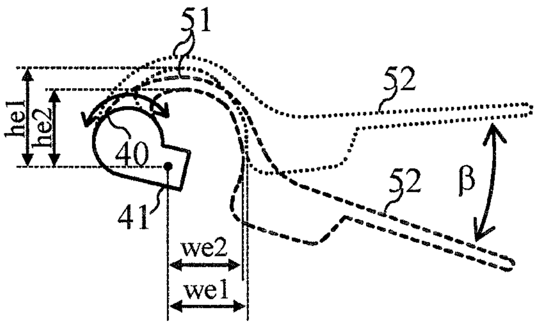

Ergonomically it may be disadvantageous if merely small parts of the nozzle 41 rest on parts of the pinna 3 due to misalignment with the tragus 301. A small contact surface may cause discomfort by increased point pressure. Moreover, acoustic coupling may be negatively affected if the nozzle output 42 of the nozzle 41 is moved away from the ear canal entry 307 due to rotational movement of the nozzle 41. In order to allow good alignment with the tragus 301 for different ear sizes, the neckband 52 or at least the ear-hook 51 can be mechanically mounted to the transducer arrangement in a way, that allows it to rotate around a pivot axis or pivot point at least partly within or alternatively close to the transducer arrangement. This is exemplary illustrated by FIG. 15A, where the neckband 52 pivots around an axis through the transducer arrangement. Dotted and dashed lines respectively represent the neckband 52 at different position within that rotational movement. The transducer arrangement including main body 40 and sound steering unit 30 with nozzle 41 does not move (solid line in FIG. 15A).

Figure 15B:
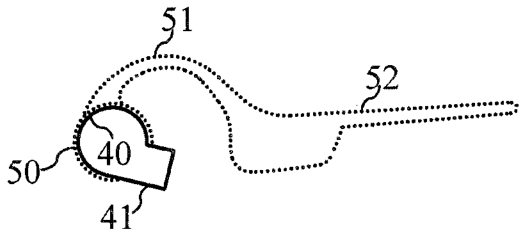

For example, a ring-shaped clamp or bracket 50 around an at least partly cylindrical main body 40 of a transducer arrangement may allow rotation around a pivotal axis running through the center of the main body 40 of the transducer arrangement. An advantage of such a clamp 50 compared to a hinge or ball-joint positioned externally of the main body 40 is that the external shape of the clamp 50 and ear-hook 51 does not change during rotation. An external hinge or ball-joint may cause disruptions in external shapes or outlines of the ear-hook 51 or similar parts of the support structure containing the hinge or ball-joint. These disruptions may be visually less appealing than seamless shapes and outlines. A rotation mechanism including the clamp 50 is illustrated by FIG. 15B, where the dotted line circle represents the ring-shaped clamp 50 around main body 40 of the transducer arrangement. The mounting mechanism may allow for a rotation angle β of more than 10 degree, more than 20 degree or more than 30 degree around at least one pivot axis. The pivot axis may be in front of the pinna 3 or alternatively at the tragus gap 43. In case of the previously described ring-shaped clamp 50 around a cylindrical main body 40 of the transducer arrangement, the pivot axis runs through the center of the main body 40. A height he (FIG. 15A) between a part of the sound steering unit 30 that covers the tragus 301 of a user, when viewed from the side of the user, and the highest point of the ear-hook 51, varies with the rotational movement of the ear-hook 51. At the same time a distance we (FIG. 15A) between the main body 40 of the transducer arrangement and a part of the ear-hook 51 that sits behind the pinna 3 of a user, may also vary with the previously described rotational movement. These distance variations allow adaption to various ear sizes concerning height and width.

Moreover, rotation around multiple pivot axes or around a pivot point may be implemented by means of one or more additional hinge, ball joint or the like. It is also possible that main body 40 and clamp or bracket 50 exhibit the shape of sphere segments thereby allowing angularly restricted rotational movements around a pivot point instead of an axis. Alternatively or additionally, a highly flexible connection between ear-hook 51 and main body 40, for example by means of a spring wire or elastic plastic, silicone or rubber material or the like, may allow for some relative rotation between main body 40 and ear-hook 51 btw. neckband 52 for ear-size adaption. The ear-hooks 51 may at least partly comprise a highly flexible material. This may, for example, allow the ear-hooks 51 to bend around the ear 3, such that the ear-hook 51 contacts the pinna 3 on at least one point in the upper or rear part of the pinna 3. Elastic restoring force of the highly flexible connection between ear-hook 51 and main body 40 or of the ear-hook 51 may vary with respect to the direction of deflection. Thereby, the elastic connection and/or the ear-hook 51 may allow for higher deflection around an axis in front of both ears, through the tragus 301 of both ears 3 or generally through both ears 3, than in a lateral direction away from the head. This direction-dependent restoring force of the ear-hook 51 may, for example, be achieved by an axisymmetric cross section area of an elastic material comprised in the ear-hook 51, which is symmetrical about a single axis (e. g. rectangular, oblong, triangular shape) and not point symmetrical (e. g. round, Square). A suitable irregular cross-sectional shape without any symmetry axis may also be applied. For example, a flat spring wire might be comprised within at least parts of the ear-hook 51. Any other elastic material comprising direction-dependent restoring force either due to geometrical features or due to material characteristics may be comprised in the ear-hook 51.

Besides the described ear-hook 51 and neckband 52, any alternative support structure may be used to secure the loudspeaker arrangement on the head or ear 3 of a user. For example, a headband as known from traditional headphones may secure one transducer arrangement or earphone or a set of transducer arrangements or earphones on the head. The headband may comprise a mechanism that allows it to pivot around an axis or point in front of the pinna 3 or at the tragus 301, similarly as has been described for the neckband 52.

The external shape of the nozzle 41 of the sound steering unit 30 may provide an inner alignment surface, intended to align to an inner part of the tragus 301 which is oriented towards the concha 304 or towards the external auditory meatus 307. This is illustrated in FIG. 10, where the nozzle 41 touches the tragus 301 above the ear canal entry 307 as shown in that Figure. For improved alignment of the nozzle 41 with the tragus 301, an external tragus alignment section 44 with an external alignment surface may be provided for an external part of the tragus 301 that is oriented away from the ear 3 or towards the main body 40 of the transducer arrangement in FIG. 10. Both alignment sections and surfaces may, for example, be part of a mechanical entity comprising the sound steering unit 30.

Figure 16:
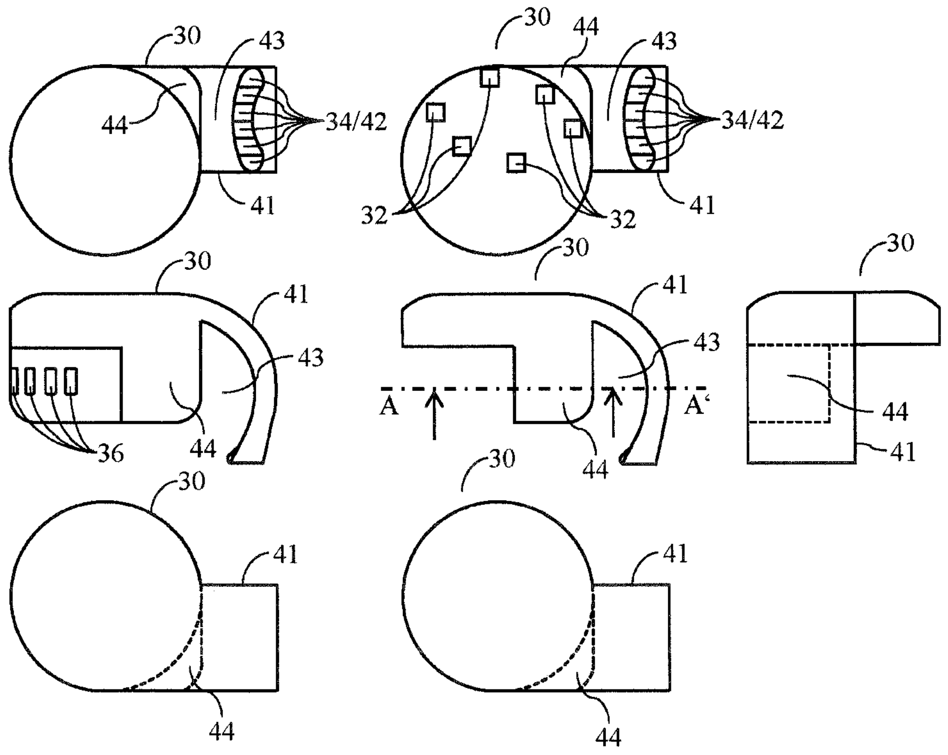

This is illustrated by FIG. 16, which shows different views of a complete transducer arrangement including main body 40 and sound steering unit 30 on the left side and the sound steering unit 30 only on the right side. The sound steering unit 30 comprises the previously described nozzle 41 intended to protrude towards the concha 304 of the pinna 3 and align with the tragus 301 on an inner surface. Additionally, the sound steering unit 30 comprises an external tragus alignment section 44, which is arranged opposing the side of the nozzle 41 that is oriented towards the main body 40. Between the external tragus alignment section 44 or the main body 40 and the nozzle 41 is a gap to accommodate the tragus 301. This tragus gap 43 has a width dt (see also FIG. 17) which is the distance between the tragus alignment surface of the external tragus alignment section 44 and the opposing surface of the nozzle 41. Over the width of the nozzle wn (see FIG. 17), the external tragus alignment section 44 and the nozzle 41 provide positional guidance of the sound steering unit 30 with respect to the tragus 301 of a user.

Figure 17:
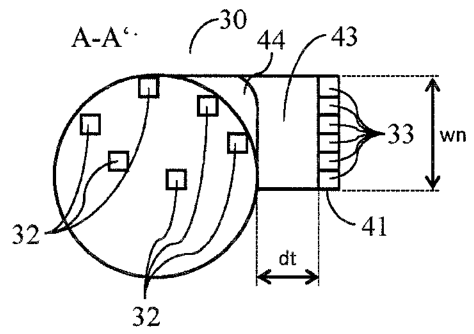

The width dt of the tragus gap 43 (FIG. 17) and the actual thickness of the tragus 301 of a user may not match. As long as the width of the tragus gap 43 is large enough to accommodate the tragus 301 of the user, the transducer arrangement can be mounted on the ear 3 of the user. External tragus alignment section 44 and nozzle 41 do not necessarily have to make contact with the tragus 301. However, if the tragus gap 43 is far too wide for a user, nozzle alignment with respect to the tragus 301 may suffer. Furthermore, a good fit of the tragus gap 43 on the tragus 301 may also be desired in order to help to secure the transducer arrangement on the ear 3 of a user. Therefore, the size of the external tragus alignment section 44 may be adapted such that the distance of the external alignment surface from the internal alignment surface of the nozzle 41 is adapted accordingly to adjust the width dt of the tragus gap 43. This is shown in FIG. 17, illustrating variations of a cross sectional view of the sound steering unit 30 between A and A' as shown in FIG. 16, where the width dt of the tragus gap 43 is adjusted by the size of the external tragus alignment section 44. A larger external tragus alignment section 44 on the right side of the Figure results in a narrower tragus gap 43 (smaller dt).

Adjustment of the size of the external tragus alignment section 44 and thereby the width dt of the tragus gap 43 can, for example, be facilitated by exchangeable elastic covers on a rigid core. This means that the external tragus alignment section 44 comprises a rigid inner core that is smaller than the complete external tragus alignment section 44. In addition, the external tragus alignment section 44 comprises an exchangeable cover of an elastic material (e.g. silicone, rubber) that increases the size of the external tragus alignment section 44 as desired if attached to the rigid core. Exchangeable covers of different size may be provided to a user to allow adjustment of the tragus gap 43 for the dimensions of the tragus 301 of the user by exchange of these covers. However, it may be sufficient to provide one reasonably sized tragus gap 43 for all users. Therefore, width dt of the tragus gap 43 may be between 4 mm and 8 mm. Furthermore, Width wn of the nozzle may be between 5 mm and 15 mm. In a preferred embodiment width wn is between 8 mm and 12 mm.

Figure 18:
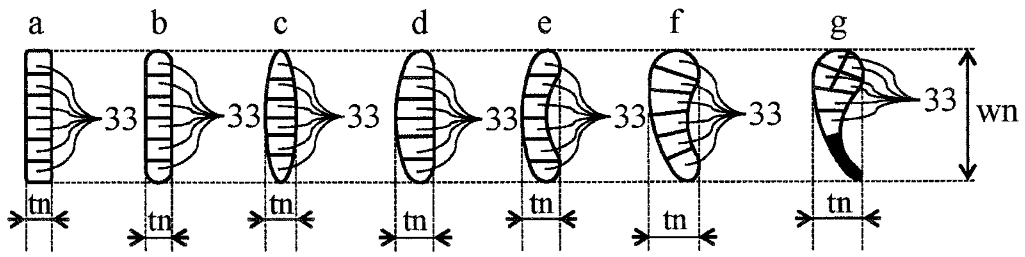

As previously mentioned, the nozzle 41 containing the sound canals 33 of the sound steering unit 30 may feature a cross section area orthogonal to the longitudinal axis of the nozzle 41 with an essentially oblong or elongated shape. Examples of such oblong or elongated shapes are shown in FIGS. 18, a to g. For any such oblong or elongated cross sectional shape, the rectangle with the shortest side lengths, which can enclose the cross sectional shape, has a longitudinal dimension (long side, see FIG. 18) defining the width wn of the nozzle 41 and a transversal direction (short side) defining the thickness to of the nozzle 41. A ratio wn/tn of more than wn/tn=2 or more than wn/tn=4 may ensure close alignment of the nozzle 41 with the tragus 301 without the nozzle 41 protruding too far in the direction of the center of the concha 304 or the antihelix 305.

The cross-sectional shape of the nozzle 41 may vary along the longitudinal axis of the nozzle 41. Regions of the nozzle 41 that do not get in contact with the tragus 301 may feature any cross sectional shape that supports aesthetically pleasing or functional design of the complete transducer arrangement. Close to the extremes of the tragus 301 in a direction away from the head, the tragus alignment surface of the nozzle 41 may for example feature a convex curvature with respect to the main body 40. This means that the cross sectional shape or at least the tragus alignment area of the nozzle 41 may bend away from the main body 40 midway along the longitudinal axis of the cross sectional shape. At the open end of the nozzle 41, the cross sectional shape may be concave with respect to the main body 40 with the tragus alignment surface of the cross sectional shape bending towards the main body 40 midway along the longitudinal axis of the cross sectional shape.

In FIGS. 18, the solid lines of the nozzle cross-sections a to g represent wall sections, while the enclosed areas represent sound canals 33. The number of sound canals 33 may differ from the examples in FIG. 18. In order to support a specific lowest playback frequency with a desired sound pressure level (SPL) on the nozzle output 42, a minimum combined cross section area of the sound canals 33 may be required. One reason is increasing air speed within the sound canals 33 with decreasing cross section area for a constant SPL on the nozzle output 42. With increasing air speed, air noise created by air flowing around any edges of the sound canals 33 increases. At certain sound pressure levels, air noise may not be acceptable anymore. Furthermore, airflow within the sound canals 33 needs to be mainly laminar in order to transmit sound efficiently from the frontal chamber 31 to the external openings 34 of the sound canals 33. With increasing air speed, airflow within the sound canals 33 becomes increasingly turbulent which reduces the output SPL for a given SPL within the frontal chamber 31. Multiple separate sound canals 33 with a given combined cross sectional area are able to keep laminar flow up to higher SPL levels than a single sound canal 33 with the same cross sectional area. This is one of the advantages of the proposed sound steering unit 30. Nevertheless, at some SPL level transition from laminar to turbulent airflow will occur.

Another reason for a minimum combined cross section area of the sound canals 33 is acoustic coupling with the entrance of the ear canal. If the cross section area of the sound canals 33 is much smaller than the cross section area of the entrance of the ear canal, sound coupling into the ear canal will be weak due to mismatch of acoustic impedance. From this perspective, a combined cross section area of the sound canals 33 similar to or larger than the cross section area of the ear canal entry 307 is desirable. On the other hand, a large nozzle 41 protruding into the area of the concha 304 will alter the pinna transfer function as previously stated. Therefore, the nozzle 41 may be designed as small as possible while providing a desired maximum sound pressure level with a desired signal to noise and distortion ratio at the lower end of the supported playback frequency spectrum of the transducer arrangement. In some embodiments the combined cross section area of all sound canals 33 may be more than 5 mm2. This may for example be the case for speech applications. In other embodiments more than 10 mm2 combined cross section area may be required. This is for example the case for high quality music playback.

Without damping, any tubular sound canal 33 will exhibit acoustic resonances, which are of most concern along the longitudinal axis of typical sound canal implementations in open earphones according to the invention. These tube resonances cause time domain ringing and a peaky magnitude response resulting in tonal coloration as well as harmonic distortion. Peaks in the magnitude response may also fall into the frequency range of the acoustic transfer function of the outer ear 3 and may therefore interfere with binaural synthesis methods for virtual sound sources which rely on transfer functions of the outer ear 3 applied by signal processing. Furthermore, harmonic distortion caused by tube resonances which are stimulated by subharmonic content of a playback signal, cannot be compensated by linear signal processing. Therefore, acoustic damping of tube resonances is preferable to mere equalizing of the loudspeaker signal.

Figure 19:
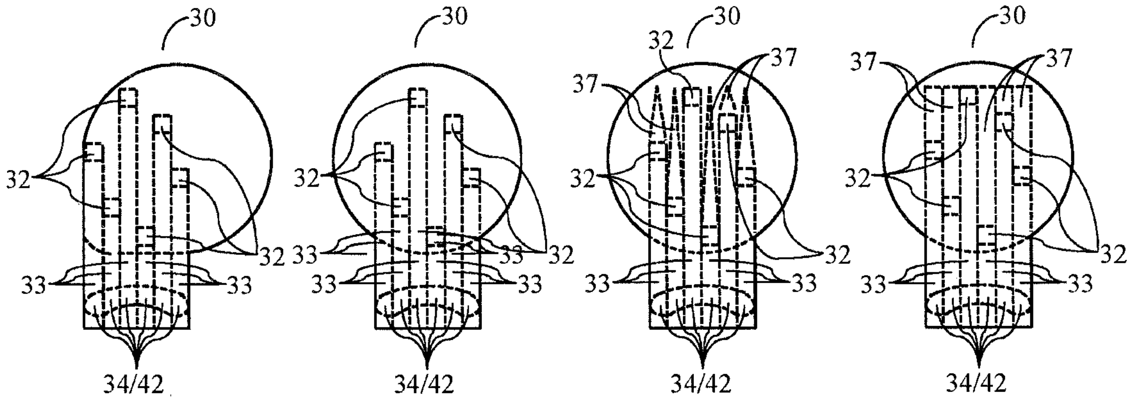

The sound canals 33 should transfer sound with the best possible efficiency and low air noise. This allows low frequency transmission with small total cross section area of all sound canals 33 of a sound steering unit 30. Furthermore, the sound steering unit 30 will essentially exhibit a low-pass or attenuating high-shelve transfer function, with reduced high frequency output. Damping methods that affect a broad frequency spectrum are therefore detrimental for full range playback if they apply damping at the extremes of the signal frequency range provided by the earphone (e.g. damping in the bass or treble region). In order to attenuate resonance frequencies selectively in the acoustic transfer function of the sound steering unit 30, multiple sound canals 33 of different length may be utilized. The length of the sound canals 33 between the respective internal opening 32 towards the frontal chamber 31 and the corresponding external opening 34 towards the outside of the transducer arrangement can for instance be controlled by the position of the former in front of the membrane of the loudspeaker 20. This is illustrated in FIG. 19, where internal openings 32 towards the frontal chamber 31 within the sound steering units 30 shown, are represented by squares. As previously described, various positions of the internal openings 32 of sound canal 33 with respect to the membrane of the loudspeaker 20 also allow for positional averaging of the sound field in front of the loudspeaker membrane.

The first two sound steering units 30 from the left in FIG. 19 comprise sound canals 33 that end at the respective internal openings 32 towards the frontal chamber 31 and external open ends 34 towards the outside, which coincide with nozzle output 42. Both sound steering units 30 on the right side of FIG. 19 feature additional stub canals 37 that extend beyond the internal openings 32 towards the frontal chamber 31. The stub canals 37 extend from the respective internal opening 32 of the sound canal 33 to a closed end of the stub canal 37 within the sound steering unit 30. In the second sound steering unit 30 from the right, the stub canals 37 are tapered, which means that the stub canal cross section area decreases towards the closed end of the stub canal 37.

Figure 20:
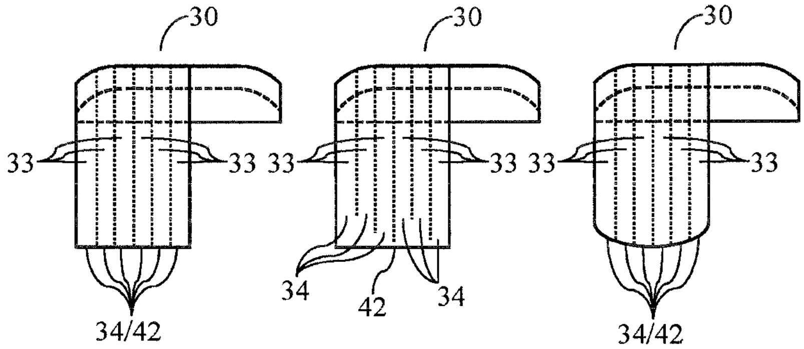

Cross section area of the stub canals 37 of the unit on the right of FIG. 19 is constant over the respective stub canal length. Another option for length variation of sound canals 33 is at the external open end 34 of the sound canals 33 towards the outside. Examples in FIG. 20 illustrate sound canals 33 ending in a flat plane on the left most sound steering unit 30, sound canals 33 ending at different points within the nozzle 41 of the sound steering unit 30 in the middle and sound canals 33 ending within a curved plane in the sound steering unit 30 on the right. A curved end section of the nozzle 41 as illustrated in FIG. 20, with the highest length of the nozzle 41 in the middle of the width wn (FIG. 17) of the nozzle and shorter length of the nozzle 41 on one or both sides of the nozzle, typically allows for the greatest penetration depth of the nozzle into the area of the concha 301 towards the ear canal entry 307, without collision of the nozzle output 42 with parts of the outer ear 3. The closer the nozzle output 42 to the ear canal entry 307, the higher the sound pressure level within the ear canal. Therefore, a curved end section of the nozzle 41, as illustrated on the right sound steering unit 30 of FIG. 20, may be preferred over flat end sections like shown on the left sound steering unit 30 of FIG. 20.

Sound canal length can also be controlled by routing of individual sound canals 33 within the sound steering unit 30. This may, for example, be used to fine tune sound canal lengths by means of surplus radii or serpentines along sound canal routes within the geometrical limits of a desired outer shape and mechanical dimensions of the sound steering unit 30. Furthermore, a single sound canal 33 may comprise multiple internal openings 32 at different distance from the external opening 34. These internal openings 32 may be distributed along the longitudinal axis of the sound canal 33. The sound canal length may then be the average of the respective lengths between the internal openings 32 and the external opening 34.

Figure 21A:
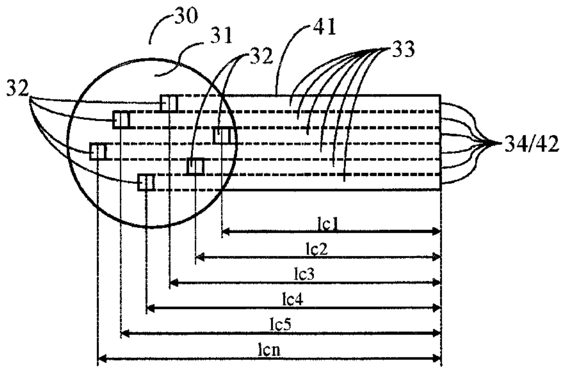
Figure 21B:
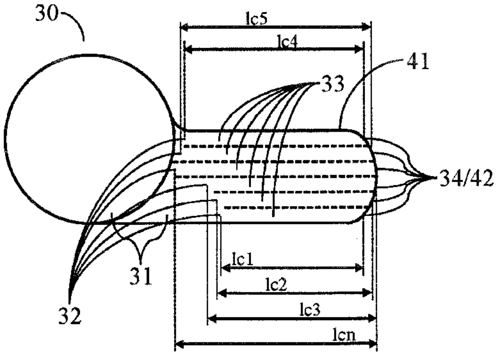

FIGS. 21A and 21B schematically illustrate lengths lc1 to lcn of n=6 sound canals 33 with respective internal openings 32 and external open ends 34 of sound steering units 30. External open ends 34 coincide with the nozzle output 42. For illustrative purpose, the sound canals 33 are drawn as straight tubes, although they may follow any suitably curved shape of a nozzle 41 in an actual implementation of the invention. FIG. 21A illustrates the frontal chamber 31 as a circular shape, while the frontal chamber 31 of FIG. 21B comprises a circular shape and an additional region in front of the internal openings 32. This additional region of the frontal chamber 31 may for example be located within parts of the nozzle 41 of the transducer arrangement of an open earphone. The frontal chamber 31 of FIG. 21B exhibits an irregular shape and may, for example, partly bend around the edge of a main body 40 of a transducer assembly. In the example of FIG. 21B, the complete sound canals 33 and their internal openings 32 are arranged within the nozzle 41. In this case, the sound canals 33 may, for example, be partly or completely located within a detachable part of the nozzle 41. This allows to optimize relative and/or absolute length and/or cross section area of sound canals 33 for different dimensions and/or shapes of multiple versions of a detachable part of the nozzle 41. Depending on the dimensions of the previously described detachable second part of the nozzle 41, sound canals 33 may be optimized for acoustic performance according to the following descriptions with respect to sound canal length lc and sound canal cross section area. Sound canals 33 of FIG. 21B may be shorter than sound canals 33 of FIG. 21A and the former may therefore exhibit tube resonances at higher resonance frequencies. Depending on the absolute lengths (lc1 to lcn) of the sound canals 33, at least higher order tube resonances may fall outside the audible frequency range or at least above 15 kHz. Absolute lengths (e. g. lc1 to lcn) of the sound canals 33 may fall into a range between 5 mm and 40 mm for preferred embodiments of the invention. For embodiments according to FIG. 21A, sound canal length lc may be within a range between 15 mm and 40 mm. For embodiments according to FIG. 21B, sound canal length lc may be within a range between 5 mm and 20 mm. While length variation over a set of n sound canals 33 with lengths lc1 to lcn as illustrated by FIGS. 21A and 21B does not necessarily need to follow any specific rule in order to dampen tube resonances, equal spacing between canal lengths on a logarithmic axis has advantages. These advantages include symmetrical damping of resonances peaks in the magnitude response on a logarithmic frequency axis as well as an equiripple magnitude response in the frequency range of the damped resonance. In both cases, the damped resonance refers to the resonance of a single sound canal 33. In order to evaluate damping performance of multi-sound-canal solutions, they may be compared to single sound canal implementations or simulations. This may also foster understanding of characteristics of the multi-canal magnitude response. For the sake of comparison, it can then be said that a certain multi-canal solution damps the resonance of a single canal solution by a certain factor or amount. It should however be noted, that the idea of a damped single resonance is merely an imaginary concept used for performance evaluation of multi-canal solutions. Depending on the number of sound canals 33 and their length distribution, a multi-canal-solution may in fact not comprise any sound canal 33 with an individual resonance at the frequency of a comparable single canal version. Reduced resonance peaks compared to single sound canals 33 result from resonance frequency spreading over a certain frequency range and mutual cancellation between sound canal outputs due to relative phase shifts.

Figure 22:
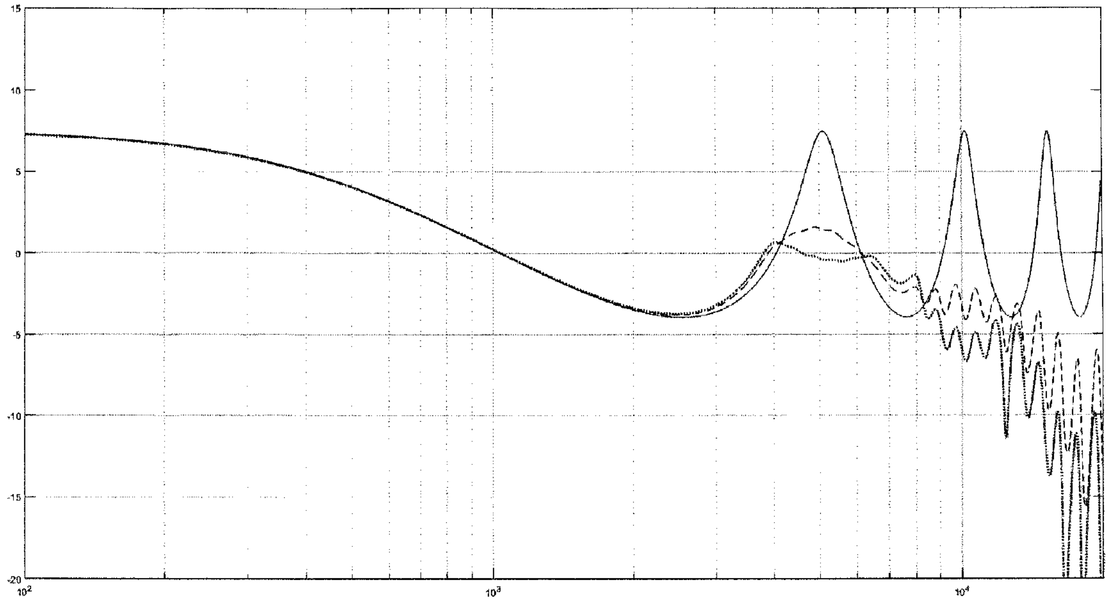
FIG. 22 shows simulation results for various sound steering unit examples

Previously mentioned symmetrical damping and equiripple magnitude response can be seen in the simulated magnitude response plots of FIG. 22. All individual sound canals 33 have been simulated as set of two coupled delay lines that carry sound waves travelling in the respective directions (in/out of the frontal chamber 31). At both ends, part of the output of one delay line is fed back into the other delay line to simulate reflections at the sound canal ends or openings. This simulation technique is known as digital waveguide synthesis. Either the output of a single delay line or the combined output of multiple delay lines is shown in FIG. 22. Simulated canal lengths for both simulated multi-canal sets where spaced equidistant on a logarithmic scale such that individual sound canal resonances of equal order are spaced equidistant on the logarithmic frequency axis of the plot.

FIG. 22 shows simulated magnitude response plots of a single sound canal (solid line) and six sound canals with variable length and equal (dotted line) as well as variable cross section area (dashed line). Symmetrical resonance peak damping can be observed around the lowest resonance frequency (1st order resonance) of the single sound canal 33 (solid line) of about 5.1 kHz. Both simulated sets of six sound canals 33 show a symmetrical magnitude response around the resonance frequency of the single canal. Both simulated sets of six sound canals 33 also show equiripple magnitude response around each respective resonance frequency of the single sound canal. Equiripple means, that the subsequent peaks and dips in the magnitude response extend over a similar level range. The equiripple characteristic is maintained within the individual resonance frequency regions of the single canal. However, magnitude ripple increases towards higher order resonance frequencies. Equidistant spacing of the lengths of n sound canals 33 on a logarithmic scale is achieved if the lengths of the canals with index k of 2 to n−1 (e.g refer to FIG. 21 for an n=6 example) satisfy the following formula provided that lc1 is the shortest length and lcn is the longest length.

$$lc(k)=10^{\wedge}(\log 10(lc(1))+(k-1)*(\log 10(lc(n))-\log 10(lc(1)))/(n-1))$$

The simulation that resulted in FIG. 22 also showed that different sound canal cross sections can be used to shape the combined amplitude response of multi-canal solutions. While the dotted line resulted from six simulated canals with equal cross section area, the dashed line is the result of a simulation with decreasing cross section area towards the extremes of the length variation range of the sound canals 33. This means that the longest (lc6) and the shortest sound canals 33 (lc1) had the smallest cross section area, followed by lc2 and lc5. The canals with length lc3 and lc4 had the largest cross section area. Variable cross section area was simulated as relative factor during the summation of the sound canal outputs. Canals with lower cross section area contribute less to the combined sound pressure. With such variation of the cross section area, the resulting magnitude response is smoother and shows less high frequency attenuation. The remaining resonance hump is less peaky and therefore easier to equalize by signal processing carried out on the signal fed to the loudspeaker 20.

While simulation predicts increasing wideband attenuation with rising frequency, real world implementations may not show this much attenuation. Simulation for FIG. 22 was calculated with exact canal lengths, whereas practical canal geometries comprise variable length over sound canal cross sections for example due to sloping or inclined routing of sound canal 33 and sound canal openings (internal or external) that are not at a right angle with respect to the longitudinal axis of the sound canal 33. With rising frequency, these small variations increasingly reduce mutual cancellation of sound canal outputs, which results in less high-frequency attenuation than simulated. Due to the same reasons, ripple at high frequencies may also be much lower than in an ideal simulation. For example for FIG. 23 slight variations of +/−3% in path lengths between the two openings for each sound canal 33 have been taken into account in simulation, which results in lower ripple and attenuation at the high frequency end.

Figure 23:
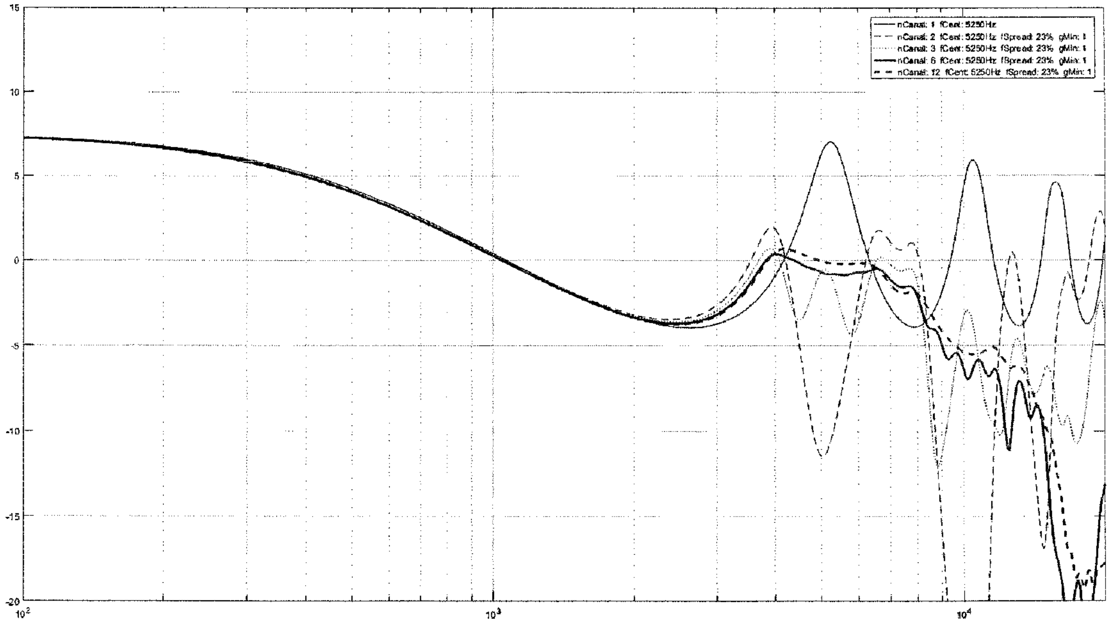
FIG. 23 shows simulation results for various sound steering unit examples

As a further example, FIG. 23 shows simulated magnitude responses for different sound canal combinations with various numbers of sound canals 33 with different lengths. Sound canal lengths of multi-canal setups have been varied such that their first order resonance falls in the range of 5250 Hz (fCent in FIG. 23)+/−23% (fSpread in FIG. 23). This means that for every combination of multiple sound canals 33, the longest canal has a first order resonance frequency of 4042 Hz and the shortest canal has a first order resonance frequency of 6457 Hz. Any additional canals have their first order resonance frequency spread equidistant on a logarithmic frequency axis. All canals have the same cross section area (gMin=1 in FIG. 23). Simulated magnitude response of a single sound canal (thin solid line), two canals (thin dashed line), three canals (thin dotted line), six canals (fat solid line) and 12 canals (fat dashed line) are shown. The simulation results suggest, that a minimum of 3 sound canals 33 with different lengths are required to achieve considerable attenuation compared to the single canal solution. With increasing number of canals, magnitude ripple decreases. For low magnitude ripple at least 5 sound canals 33 with different length may be utilized.

Figure 24:
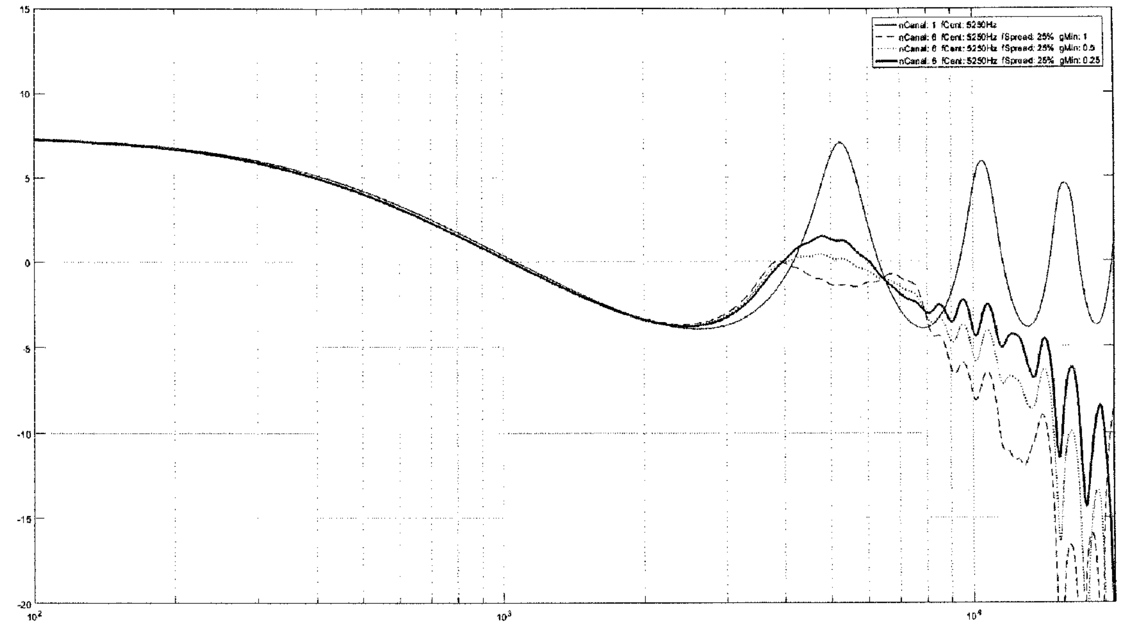
FIG. 24 shows simulation results for various sound steering unit examples

Cross section area of the respective sound canals 33 between their respective internal opening 32 towards the frontal chamber 31 and their respective external opening or open end 34 towards the outside may be constant at least over the largest part of their course. This allows for the smallest possible combined cross section area of all canals along their entire course. Combined minimum cross section area of all sound canals 33 essentially determines the maximum low frequency SPL at the nozzle output 42 of the sound steering unit 30 without air noise. However, flared sound canal ends or openings may reduce air noise. Furthermore, cross section area may vary between sound canals 33. This was simulated for FIG. 24, where for a set of six combined sound canals 33 with a spread of +/−25% of their first order resonance frequency around a center frequency fCent of 5250 Hz, the relative cross section area between canals was varied. Parameter gMin (see FIG. 24) determines the relative gain applied to the shortest (e.g. lc1 in FIG. 21) and longest sound canal 33 (e.g. lcn btw. lc6) relative to the central sound canals 33 (lc3 and lc4) in order to simulate various cross section area as previously described. Intermediate canals (lc2 and lc4) had simulated cross section area midway between these extremes (e.g. gMin 0f 0.5 means lc1 and lc6 with 50% cross section area, lc2 and lc4 with 75% and lc3 and lc4 with 100%). For all simulated sets of sound canals 33, the sum of all cross section areas was identical. Therefore, cross section area variation was merely relative within a set of sound canals 33. FIG. 24 shows simulated magnitude responses of a single sound canal (thin solid line) and six combined sound canals with equal cross section area (dashed line), variable relative cross section area down to 50% (dotted line) and variable relative cross section area down to 25% (fat solid line) of the maximum cross section area.

Simulation of FIG. 24 shows that the slope of the magnitude response is affected by different cross section variations. Depending on the requirements of a specific sound steering unit 30, more or less attenuation at the upper frequency end may be desired which can be influenced by canal cross section distribution. Less high frequency attenuation and the shape of the remaining first order resonance hump in the magnitude response resulting from the highest variation in cross section area (gMin=0.25) may be advantageous for full-range audio signal transmission through the sound steering unit 30.

Figure 25:
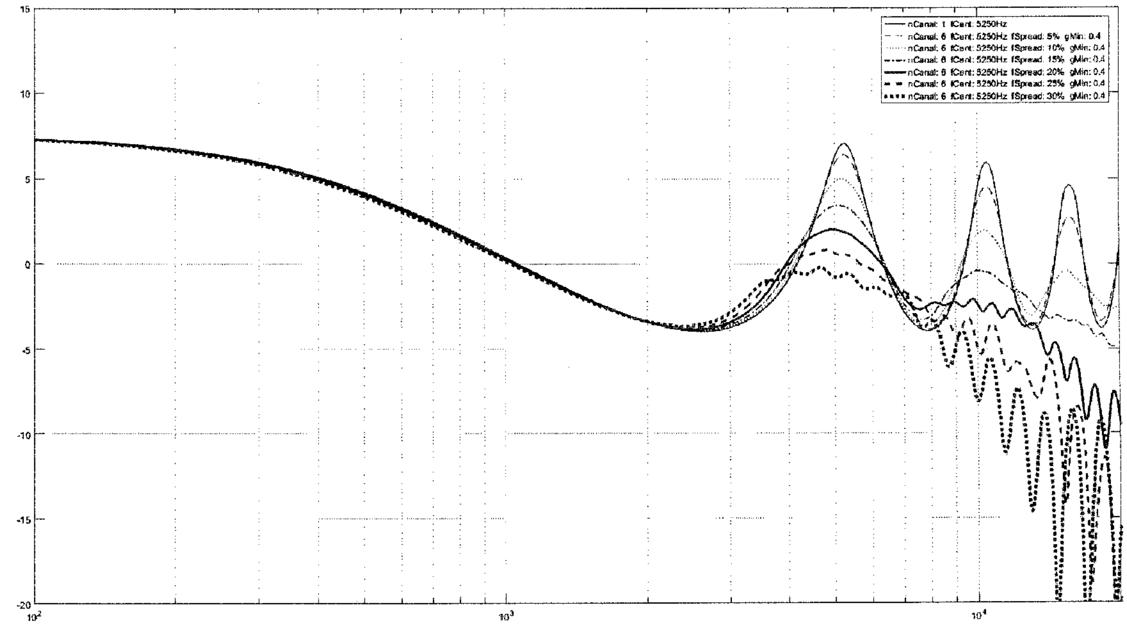
FIG. 25 shows simulation results for various sound steering unit examples FIG. 26 schematically illustrates geometric features of various sound steering unit examples FIG. 27 schematically illustrates various sound steering unit examples FIG. 28 schematically illustrates an exemplary transducer arrangement with sound steering unit and direct radiating loudspeaker FIG. 29 schematically illustrates exemplary positions for direct radiating loudspeaker on a transducer arrangement and support structure FIG. 30 schematically illustrates a rear chamber ventilation example FIG. 31 schematically illustrates a rear chamber ventilation example FIG. 32 schematically illustrates various exemplary receiving transducer locations FIG. 33 schematically illustrates an exemplary generic signal flow diagram for error correction FIG. 34 schematically illustrates an exemplary generic signal flow diagram for acoustic echo cancellation

Effects of sound canal length variation are shown in FIG. 25. For sets of six combined sound canals 33 with identical cross section variation between canals (gMin=0.4), the length has been varied such that the first order resonance frequencies are spread between +/−5% and +/−30% around a center frequency fCent of 5250 Hz. Simulated magnitude response of a single sound canal (thin solid line) and six combined sound canals with variable cross section area (gMin=0.4) and a first order resonance frequency spread fSpread of 5% to 30% in 5% increments around center frequency fCent of 5250 Hz are shown. For a given number of sound canals 33 increased spread of their first order resonance frequencies causes increased magnitude ripple. At the same time resonance damping compared to a single sound canal 33 as well as high frequency attenuation also increase with first order resonance frequency spread. For considerable resonance damping, a first order resonance frequency spread of more than 10% or more than 20% may be required. Consequently sound canal length between internal opening 32 and external open end 34 needs to vary by more than +1-10% or more than +/−20% of the average sound canal length.

In order to reduce magnitude ripple and attenuation at high frequencies, fuzziness in canal lengths can be promoted by stub canals 37 as for example shown in FIG. 19 (two sound steering units 30 on the right) and 26. Such stub canals 37 may be employed to reduce magnitude ripple and high-frequency attenuation. Quarter wavelength stubs are, for example, known from transmission line loudspeaker enclosures. Frequencies for which the wavelength equals four times the length of the quarter wavelength stub are attenuated by the reflection from the stub, which returns after half a wavelength with 180° phase shift. Stub canal length may therefore be chosen as quarter wavelength of a sound canal resonance that shall be attenuated. This resonance may be the first order or any higher order resonance. With limited space, the second or third order resonances of the employed sound canals 33 may be chosen to determine stub canal length. This means that the longest sound canal 33 also requires the longest stub canal 37 because it exhibits the lowest resonance frequencies. However, in a sound steering unit 30 with multiple sound canals 33 each respective stub canal 37 does not need to connect to the sound canal 33 for which it shall attenuate a specific resonance. It may alternatively be connected to any other sound canal 33 of a sound steering unit 30. As sound canal outputs mix, the attenuation applied to any sound canal 33 will affect combined sound output of all canals.

Figure 26:
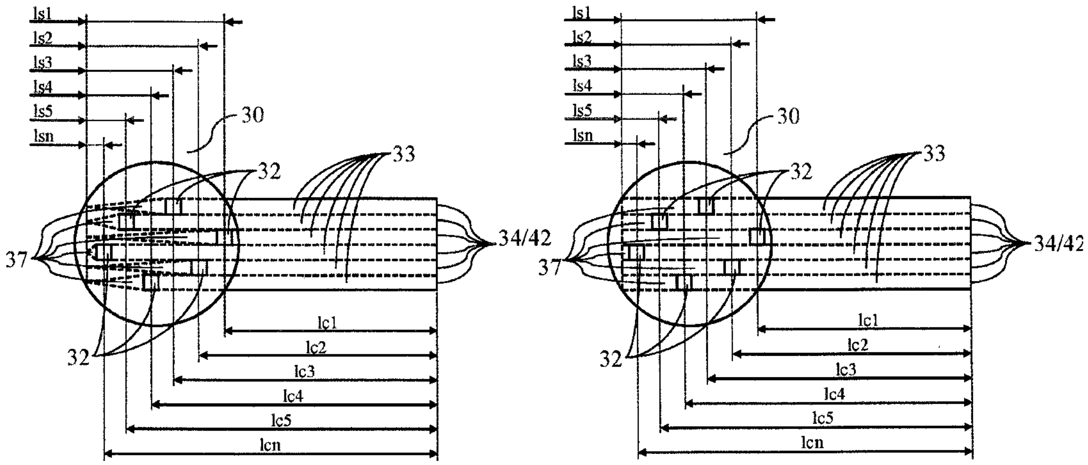

With reference to the naming scheme of FIG. 26, the ith order resonance frequency fres of sound canal 33 with index k can be calculated as:

$$\text{fres}(i,k)=i*c/(2*1c(k))$$

Where i is a positive integer, c is the speed of sound and lc(k) the length of the kth sound canal 33 between its respective openings.

The acoustic wavelength λ can be calculated as λ=c/fres and therefore the length ls of a quarter wavelength stub canal 37 tuned to the ith order resonance of the kth sound canal 33 can be calculated as:

$$ls(i,k)=c/(4*\text{fres}(i,k))==lc(k)/(2*i)$$

In practical applications, the length of a stub canal 37 tuned to relevant tube resonances of a sound canal 33 is a fraction of the length of the sound canal 33, wherein the fraction may be 1 divided by an even integer between 1 and 11 (divisor is one of 2, 4, 6, 8 and 10). As previously described, stub canals 37 may be connected to any sound canal 33 of a sound steering unit 30. This is also shown in FIG. 26, where the shortest stub canals 37 are connected to the longest sound canals 33 in order to keep total canal length as short as possible.

Stub canal lengths do not necessarily require having a quarter wavelength of specific sound canal resonances. Especially tapered stub canals 37 may simply use the available space. Due to the difference in length between stub canals 37 and the tapered shape, such stub canals 37 may still help to reduce ripple and attenuation at high frequencies. However, also stub canals 37 with quarter wavelength may be tapered over at least part of their length to widen the frequency range for which they provide resonance damping by reflected sound. As sound canal length may also vary over the cross section area of a sound canal 33 as previously described, corresponding variation in stub canal length over stub canal cross section area may provide a smoother frequency response of the sound steering unit 30.

Figure 27:
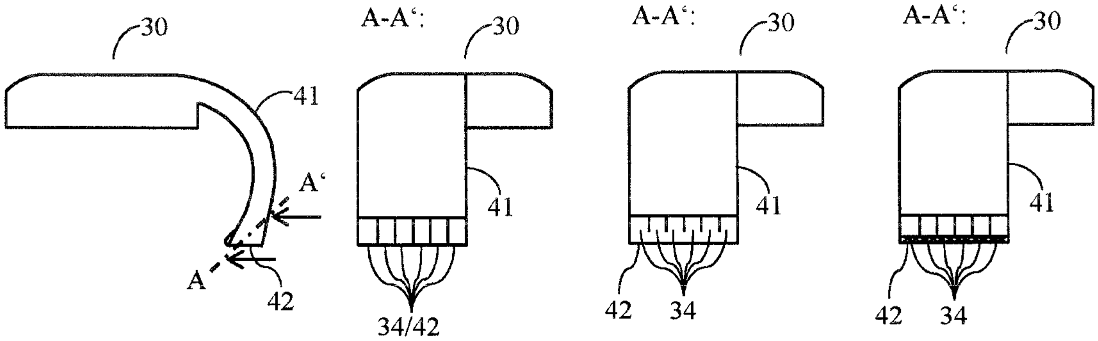

As illustrated in FIGS. 20 and 27, sound canals 33 may either open directly to the outside of the transducer arrangement or join within the nozzle 41 close to the nozzle output 42. In the first case, the external open ends 34 of the sound canals 33 coincide with the nozzle output 42. In the second case, the external open ends 34 of the sound canals 33 open towards a joint volume within the nozzle 41. In both cases, the external open end 34 of the sound canal 33 determines the length of the respective sound canal 33. The reason is that sound canal resonances develop between the internal opening 32 (sound input) of the sound canal 33 and the external opening or open end 34 (btw. sound output) of the sound canal 33.

In FIG. 27 three exemplary arrangements of the output junction of the sound canals 33 are shown in cross sectional views (A-A'). The first cross sectional drawing from the left shows a configuration where the external open ends 34 of sound canals 33 coincide with the nozzle output 42 of the nozzle 41. In the second example from the left sound canals 33 join one common volume within the nozzle 41 close to the nozzle output 42. The third example (right-most drawing) shows sound canals 33 ending at a mesh covering the nozzle output 42. The mesh may serve as a protection filter against ingress of cerumen (earwax) and/or as acoustic damping element. The latter may be facilitated with a mesh that exhibits a controlled acoustic resistance greater than 200 Rayl MKS, greater than 500 Rayl MKS or greater than 1000 Rayl MKS. A mere cerumen protection filter may exhibit an acoustic impedance of less than 50 Rayl MKS.

Acoustic damping with resistive mesh may also be applied to internal openings 32 of sound canals 33 towards the frontal chamber 31. The acoustic impedance of such a mesh may be greater than 200 Rayl MKS, greater than 500 Rayl MKS or greater than 1000 Rayl MKS. This will have a damping effect on the sound canal resonances as well as on a Helmholtz resonance that occurs between the air volume within the frontal chamber 31 of the sound steering unit 30 and the air within the sound canals 33 of the sound steering unit 30.

A sound steering unit 30 may steer sound from multiple loudspeakers 20. Multiple loudspeakers 20 may either share one common rear chamber 35 or be contained within individual rear chambers 35 comprised in a single transducer arrangement. Likewise, a sound steering unit 30 for multiple loudspeakers 20 as part of a single transducer arrangement may comprise a single or multiple frontal chambers 31. The number of individual frontal chambers 31 and rear chambers 35 of a single transducer arrangement are independent. Sound canal length variation for damping of sound canal resonance as previously described, may be applied over the total number of sound canals 33. An exemplary sound steering unit 30 with two individual frontal chambers 31 may comprise six sound canals 33 in total of which three each comprise an internal opening 32 towards one of the two frontal chambers 31. Length and cross section variation over the complete set of six sound canals 33 may be as described above. Preferably, the average length of the respective sets of three sound canals 33 per frontal chambers 31 is different. This will result in different Helmholtz resonance frequency and or quality factor for the two combinations of sound canals 33 and frontal chamber air volumes. Thereby Helmholtz resonance peaks in the magnitude response of the combined sound from both frontal chambers 31 at the nozzle output 42 may be damped in comparison to a single Helmholtz resonance resulting from a single frontal chamber 31.

Furthermore, two separate frontal chambers 31 may provide smaller individual air volumes than a single frontal chamber 31. Smaller air volumes result in higher frequency Helmholtz resonances, which can be damped easier with suitable acoustic measures (e.g. resistive mesh). In order to achieve the previously described resonance damping effects for the sound canal resonances, loudspeakers 20 in both frontal chambers 31 need to generate sound within the frequency range of sound canal resonances that shall be damped. This can, for example, be achieved with a similar signal played over similar loudspeakers 20 per frontal chamber 31. It is, however, also possible to use different loudspeakers 20 per chamber for which sound playback is controlled, such that amplitude and phase match within a frequency range for which sound canal resonances shall be damped.

Figure 28:
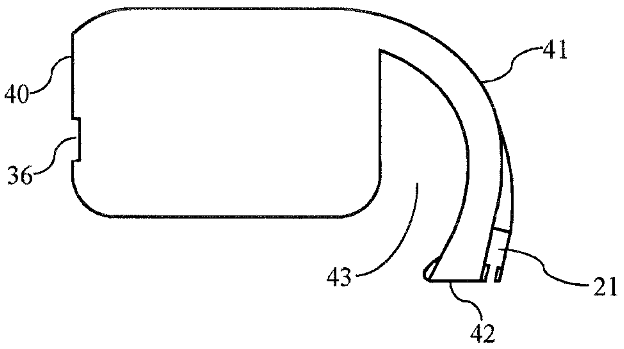

Besides loudspeakers 20 coupled to a sound steering unit 30, additional high frequency loudspeakers 21 may be comprised in the transducer arrangement of an open earphone. Additional high frequency loudspeakers 21 will typically provide a higher frequency range than the loudspeaker(s) 20 coupled to the sound steering unit 30. Advantages of additional high frequency loudspeakers 21 include less adverse effects of sound canal resonances as well as the acoustic induction of natural directional pinna cues. Sound canal resonances usually occur in a higher frequency range, for example above 1-5 kHz. If total sound output of the earphone is distributed between the sound steering unit 30 and any additional high frequency loudspeakers 21, such that the sound steering unit 30 merely carries sound below the sound canal resonances, the latter have less adverse effects. For example, an additional high frequency loudspeaker 21 could play frequencies above 2 kHz. For this high frequency range small loudspeakers can provide sufficient SPL and therefore these loudspeakers may be integrated to an earphone without substantial compromise in size, aesthetics or ergonomics. A good option is the integration of a balanced armature driver or any other loudspeaker in a similar small form factor into the nozzle 41 close to the nozzle output 42. This is shown in FIG. 28, where a rectangular shape with tubular duct at the nozzle output 42 symbolizes a balanced armature driver as high frequency loudspeaker 21.

Figure 29:
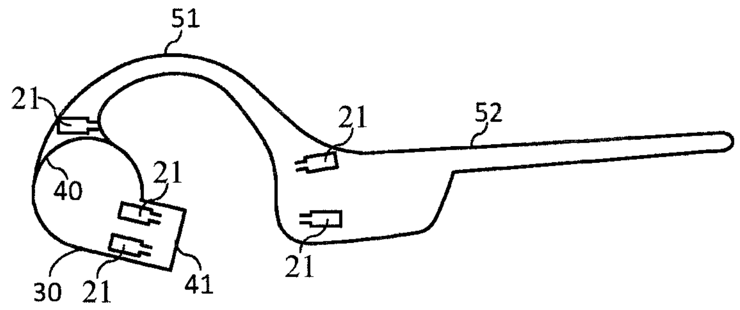

Directional pinna cues can be induced by stimulation of acoustic pinna resonance and cancellation effects. These effects, referred as pinna resonances, occur specifically when sound waves from a certain direction hit the pinna 3 and especially the region of the concha 304. Reflection and diffraction effects within the cavities of the pinna 3 cause transfer functions of the pinna 3 towards the ear canal entry 307 that are unique for any direction of incoming sound. These effects are utilized by the human auditory system for localization of sound and may therefore be used for binaural virtual sound source synthesis. Potential loudspeaker positions on the earphone are shown in FIG. 29. High frequency loudspeakers 21 on various positions on the nozzle 41, the ear-hook 51 and the neckband 52 support induction of directional pinna cues associated with multiple directions. Positions shown in FIGS. 28 and 29 are to be understood as non-limiting examples. Although high frequency loudspeakers 21 in FIGS. 28 and 29 are symbolized by typical outline shapes of balanced armature drivers, any suitable loudspeaker type or technology may be utilized within a transducer arrangement of an open earphone. Another example would be loudspeaker types including microelectromechanical systems (MEMS). Widespread dynamic loudspeakers are obviously also an option.

Sound leakage towards the environment of the user of any head or earphone is usually considered a disadvantage of such devices. In order to reduce sound leakage of open earphones according to the invention, several measures may be taken. In case a ventilated rear chamber 35 is utilized for the loudspeaker(s) 20 driving the sound steering unit 30, such measures include the integration of an additional high frequency loudspeaker 21 at the nozzle output 42 as previously described. If the loudspeaker(s) 20 driving the sound steering unit 30 do not radiate high frequency sound, high frequency sound leakage through any rear ventilation opening 36 or the like of a ventilated rear chamber 35 will be reduced or avoided.

A ventilated rear chamber 35 can be smaller than a sealed chamber especially if low frequency output is expected from the transducer arrangement. In the ventilated rear chamber 35, merely a small air volume is required to provide sufficient cross section area for ventilation airflow. No large rear volume is needed as would be the case for a similar low-frequency extension of a loudspeaker 20 within a sealed rear chamber 35. Because of essentially inverse polarity between sound radiated by the loudspeaker 20 from both respective sides of the loudspeaker membrane, sound output from the sound steering unit 30 and the rear ventilation opening(s) 36 respectively will mutually cancel at least partly at certain positions around the transducer arrangement and at certain frequencies. Mutual cancellation may work best for a lower frequency range, where the acoustic environment of the loudspeaker(s) 20 has lower effect on magnitude and phase of the radiated sound from the loudspeaker 20. The acoustic environment of the loudspeaker(s) 20 includes the complete transducer arrangement as well as the head and ear 3 of a user. However, SPL at the nozzle output 42 may be high, but it will decrease rapidly with increasing distance from the nozzle output 42. In case of close proximity of the nozzle output 42 to the ear canal entry 307 of a user, far field SPL and thereby sound leakage will be low for frequencies at and below the Helmholtz resonance of the sound steering unit 30.

Figure 30:
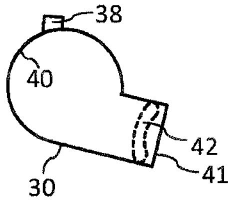
Figure 31:
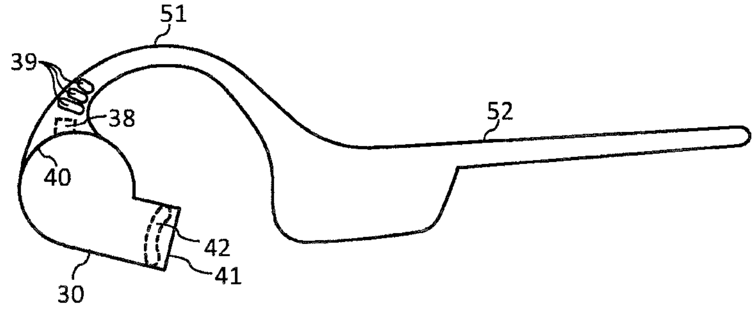

As previously described, a Helmholtz resonance will develop between the air volume in the frontal chamber 31 of the sound steering unit 30 and the sound canals 33. For a frequency range above that Helmholtz resonance, the sound steering unit 30 will exhibit low-pass or attenuating high-shelve behavior apart from any sound canal resonances. If the sound steering unit 30 shall deliver the full audible high-frequency spectrum, the loudspeaker output needs to be boosted considerably in that frequency range in order to compensate for the acoustic filter characteristics of the sound steering unit 30. The sound radiated on the rear side of the loudspeaker membrane will therefore also be high and an acoustic low-pass may be applied to the rear chamber ventilation in order to reduce sound leakage through this path. Acoustic low pass behavior for the rear ventilation may for example be achieved by a rear ventilation duct 38 as shown in FIG. 30. A rear ventilation duct 38 lowers the Helmholtz resonance frequency of the rear chamber 35 compared to a simple opening. An exemplary integration of a rear ventilation duct 38 is shown in FIGS. 30 and 31, where a rear ventilation duct 38 is attached to the rear chamber 35, through which the rear chamber 35 is ventilated. Such a rear ventilation duct 38 may for example end within a hollow ear-hook 51 with additional ear-hook ventilation openings 39 in the ear-hook 51 towards the outside of the complete earphone. An ear-hook 51 is for example shown in FIG. 9 and was previously described with reference to that Figure. A rear ventilation duct 38 within the ear-hook 51 is shown in FIG. 31. The rear ventilation duct as shown in FIGS. 30 and 31 is located in a distance to the nozzle 41 and the nozzle output 42. When viewed from a lateral direction as in FIGS. 30 and 31 and referenced to the center of the circular main body 40, the rear ventilation duct 38 connects to the main body 40 with about 120° angular shift compared to the nozzle 41. This position was chosen for the embodiment of FIG. 31 in order to locate the rear ventilation port 38 within the ear-hook 51. The rear ventilation duct 38 may, however, also be located closer to the nozzle 41 or nozzle output 42. For example, the rear ventilation duct 38 may be located next to the nozzle 41 or below the nozzle 41. In the latter case, the nozzle 41 may cover the rear ventilation duct when viewed from a lateral direction as in FIG. 30. The rear ventilation duct 38 may in this case release sound within the tragus gap 43 or directly adjacent to the tragus gap 43. This may reduce acoustic leakage toward the environment with acceptable reduction in sound level at the nozzle output 42 and therefore at the ear canal entry 307. The rear ventilation duct 38 may release sound within a distance of 5 mm to 45 mm from the nozzle output 42. In a preferred embodiment the rear ventilation duct 38 may release sound within a distance of 20 mm to 45 mm from the nozzle output 42.

The rear Helmholtz resonance of the ventilated rear chamber 35 and the frontal Helmholtz resonance of the frontal chamber 31 of the sound steering unit 30 in combination with sound canals 33 may be matched in frequency. The Helmholtz resonance of the rear chamber 35 may be within +1-15% or within +1-30% of the Helmholtz resonance frequency of the sound steering unit 30. The air volume in the rear chamber 35 as well as the length and cross section area of the rear ventilation duct 38 determines the rear Helmholtz resonance frequency and resonance quality. Sound canal length and cross section area as well as frontal chamber volume of the sound steering unit 30 determine the Helmholtz resonance frequency and resonance quality of the sound steering unit 30. Aforementioned parameters may be adjusted in order to match frequency and optionally quality for frontal and rear Helmholtz resonance. Dual ventilated loudspeaker enclosures with a loudspeaker mounted in a wall between both enclosure volumes, are known as 6th order bandpass. Usually frontal and rear resonance frequency are tuned different in order to have bandpass output in the far field of the enclosure. In case of the open earphone, high SPL is desired at the nozzle output 42 but low SPL in the far field. Without consideration of the external acoustic environment of the transducer arrangement, matched frontal and rear Helmholtz resonances may achieve this at least within a certain frequency range.

Typical Helmholtz resonance frequencies of a sound steering unit 30 according to the dimension shown e.g. in FIG. 10, will be above 500 Hz, above 1 kHz or even above 2 kHz. Bass-reflex enclosures, providing a much lower Helmholtz resonance frequency, e.g. below 100-150 Hz, that could theoretically be used to extend the frequency range provided by a transducer arrangement, do not work within the size constraints of an ergonomically and visually satisfying earphone. Such a low Helmholtz resonance frequency requires a large enclosed air volume, which results in a large loudspeaker enclosure. Alternatively, a smaller enclosed air volume may be combined with a long duct with small cross section area. While the length of the duct may be a problem for integration to an earphone and cause tube resonances starting at a relatively low frequency, the most severe drawback is the small cross section area of the duct, which cannot provide sufficient sound pressure level (SPL) for music reproduction with good sound quality. Reasons are excessive air noise generated within ducts with small cross section area due to high air speed and gross impedance mismatch between duct and ear canal entry resulting in adverse acoustic coupling. Small air volumes in frontal chamber 31 and rear chamber 35 combined with sound canals 33 respectively rear ventilation opening 36 or rear ventilation duct 38 with sufficient cross section area, result in aforementioned high Helmholtz resonances. As long as a loudspeaker with sufficient air volume displacement is applied within the transducer arrangement, a wide frequency range can be provided with high SPL. A capable loudspeaker can be much smaller than a bass-reflex enclosure tuned to a resonance frequency below 100-150 Hz. Therefore, the technical concept with high Helmholtz resonances of the sound steering unit 30 and the ventilated rear chamber 35 results in much smaller transducer arrangements for a given frequency range and maximum SPL than acoustically comparable bass-reflex enclosures.

With increasing frequency, the acoustic environment of the transducer arrangement will increasingly influence mutual cancellation of frontal and rear sound output. Lower Helmholtz resonance frequencies require higher chamber volumes and/or longer rear ventilation duct 38 btw. sound canals 33 and/or smaller cross section area for rear ventilation duct 38 btw. sound canals 33. None of these geometric requirements are desirable. As size of wearable devices shall typically be minimized, large air volumes and long sound canals 33 are to be avoided. Small cross section area of the sound canals 33 reduces clean low frequency SPL at the nozzle output 42. Small cross section area of the rear ventilation duct 38 may drastically increase loudspeaker distortion in the low frequency range. Finally, the aforementioned low-pass behavior of the sound steering unit 30 starts at a higher frequency if the Helmholtz frequency is higher. This is another reason to maximize the Helmholtz frequency at least for the sound steering unit 30 by minimizing the frontal chamber volume. Typically, the frontal chamber dimensions are determined by required space for loudspeaker membrane excursion and airflow without excessive compression. Note that the membrane of the loudspeaker 20 as for example shown in FIGS. 10 and 11, may have a direction of membrane excursion that is essentially perpendicular to the wall sections of the frontal chamber 31 located in front of the membrane of the loudspeaker 20. So at least sufficient clearance is required in order not to obstruct membrane movement. In addition, there needs to be sufficient air volume in front of the membrane, that airflow is possible without excessive compression even for the extremes of the excursion range of the loudspeaker 20. The air volume within the frontal chamber 31 of the sound steering unit 30 may therefore be less than 2 times or less than 4 times the maximum air volume displaced by all loudspeakers 20 driving the sound steering unit 30. Maximum air volume displacement Vdmax for a dynamic loudspeaker may be defined as Vdmax=Sd*xmax, where Sd is the sound radiating area of the loudspeaker (typically including the membrane and part of the surround) and xmax is the maximum possible excursion of the loudspeaker due to mechanical limitation.

Therefore, a transducer arrangement utilized in open earphones according to the invention will typically exhibit Helmholtz resonance frequencies far above the lower end of the supported playback frequency range. The lower end of the supported playback frequency range may be defined as the frequency within the low frequency roll-off of the magnitude response of the earphone where the magnitude drops below −10 dB compared to 1 kHz. In this context, the earphone is to be understood as complete device, which may for example comprise equalizing within suitable active or passive electronic filters. The supported playback frequency range does not refer to the passive amplitude response of the transducer arrangement alone. Aforementioned Helmholtz resonances are not used to extend the passive low frequency excursion of the transducer arrangement like for example in bass reflex or bandpass loudspeaker enclosures. To the contrary, the lower end of the supported frequency range will typically be more than 4 times or more than 8 times lower than the Helmholtz frequency of the sound steering unit 30.

A further advantage of matched Helmholtz resonances besides reduced sound leakage is mutual resonance damping and therefore reduced magnitude peaks in the outputs of the sound steering unit 30 as well as the rear ventilation duct 38. Within the frequency range of the Helmholtz resonance of a ventilated chamber, the excursion of the membrane of a loudspeaker (e.g. loudspeaker 20) mounted in a wall of the chamber is damped by reactive forces of the resonating air inside the chamber and duct. At the Helmholtz resonance frequency loudspeaker excursion has a local minimum. With both Helmholtz resonances tuned to the same frequency and potentially the same quality, loudspeaker excursion will be reduced at resonance frequency compared to a single Helmholtz resonance (front or rear side) with identical parameters.

An alternative or additional option to achieve acoustic low-pass behavior of the rear ventilation is the application of acoustically resistive mesh on the rear ventilation opening(s) 36. Mesh may also cover the opening of a rear ventilation duct 38. The acoustic impedance of such a mesh may be greater than 200 Rayl MKS, greater than 500 Rayl MKS or greater than 1000 Rayl MKS.

Effects of Helmholtz resonance matching on sound leakage and general sound leakage depend on the acoustic environment of the transducer arrangement, namely the head and ear 3 of a user. With the nozzle output 42 of the sound steering unit 30 positioned close to the ear canal entry 307 and oriented towards the same, sound leakage from the nozzle output 42 may be low. As previously described acoustic low-pass behavior of the sound steering unit 30 may require considerable high-frequency boost if the output of the sound steering unit 30 shall extend to at least 16 kHz or even 20 kHz. This may result in excessive sound leakage from the rear ventilation opening(s) 36 or rear ventilation duct 38. For additional high frequency damping, the output of the rear ventilation duct 38 may be located within a hollow part of the ear-hook 51 as shown in FIG. 31. The ear-hook 51 may then comprise ear-hook ventilation openings 39 to the outside. Application of acoustically damping material within the ear-hook 51 or resistive mesh on the openings of the ear-hook 51 can further decrease rear sound leakage. For lowest sound leakage, it may however be preferable to avoid damping of frequencies below the Helmholtz resonance frequency of the sound steering unit 30.

Although ear-hook ventilation openings 39 in the ear-hook 51 are shown on a side that points away from the user of the earphone in FIG. 31, these ear-hook ventilation openings 39 may be located at any position on the ear-hook 51. They may for example be on a part of the ear-hook 51 which is oriented towards the head of the user provided that the shape of the ear-hook 51 allows for some clearance from the head. The rear ventilation duct 38 covered by the ear-hook 51 may also be a good solution from an aesthetical point of view. With enough clearance around the rear ventilation duct 38, rotation of the ear-hook 51 around the rear chamber 35 and/or frontal chamber 31 btw. main body 40, as previously described with reference to FIGS. 14 and 15, may still be possible. Alternatively the rear ventilation duct 38 may be integrated to the main body 40.

Figure 32:
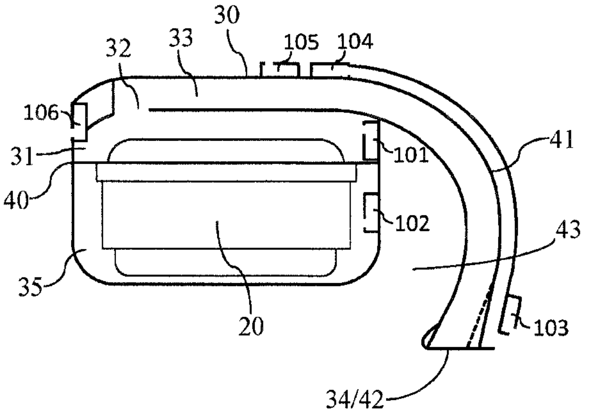

Besides radiating acoustic transducers (loudspeakers), the transducer arrangement may also comprise receiving acoustic transducers (microphones). Because radiating and receiving transducers interact in specific ways for different relative placement within the transducer arrangement, certain combinations of radiating and receiving transducers provide advantages for specific applications. In the following, microphone pickup locations shown in FIG. 32 will be discussed. In FIG. 32, microphones are symbolized by rectangles with reference numbers 101 to 106. The opening within the rectangle indicates the sound input of the microphone. The decisive factor for the microphone location is the position of the opening of the microphone not the position of the microphone itself. Positions shown in FIG. 32 are however merely exemplary and stand for certain regions of the transducer arrangement as further outlined below.

Especially position 101 (somewhere within the frontal chamber 31 of the sound steering unit 30) and to a lesser extent also position 102 (somewhere within the rear chamber 35) are suited for compensation of loudspeaker nonlinearities by one or multiple parallel or nested control loops. A control loop may comprise at least one of the respective microphones and at least one loudspeaker 20 of the transducer arrangement for which distortion shall be reduced. Besides receiving and radiating transducers, a control loop may comprise passive or active electrical circuitry for signal conditioning (e.g. amplification, source impedance conversion, conversion between analog and discrete time domains) and signal processing (e.g. filtering, compression, limiting). Such passive or active circuitry may anyways be included in a head- or earphone comprising a transducer arrangement according to the invention. Positions 101 and 102 receive loudspeaker output with much higher SPL than ambient sound. Therefore, a control loop comprising these microphones will correct loudspeaker nonlinearities without notable effect on ambient sound at the ear 3 of a user. This means, that the predominant compensation of loudspeaker nonlinearities by the control loop with negligible effect on ambient sound, is a result of acoustic properties of the transducer arrangement. The latter comprising rear chamber 35, sound steering unit 30 as well as radiating and receiving acoustic transducers. Compensation of loudspeaker nonlinearities improves sound quality, which may be particularly necessary for open earphones according to the invention due to small loudspeakers applied in the transducer arrangement for miniaturization. Furthermore, the performance of a linear acoustic echo canceller (AEC) applied to a speech pickup microphone comprised in the transducer arrangement (e.g. at positions 105 and/or 106) may be better if the loudspeaker signal contains less distortion.

Figure 33:
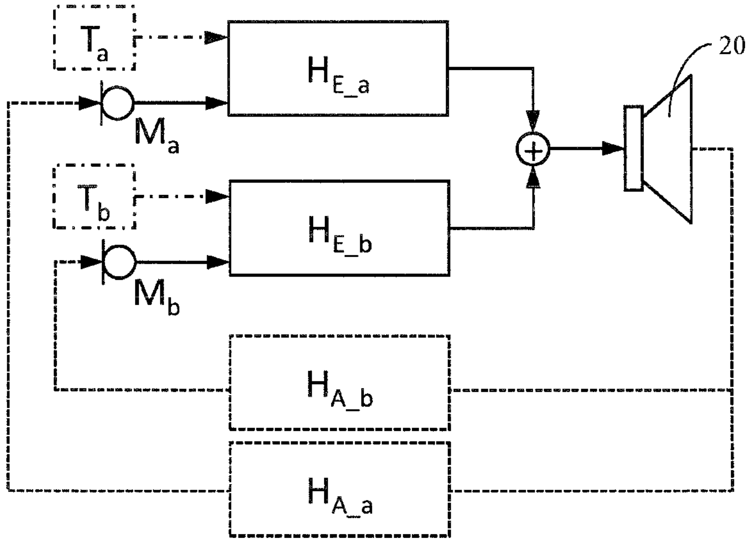

A generic signal flow for open and/or closed loop error correction is shown in FIG. 33. Transfer functions $H_{A\_a}$ and $H_{A\_b}$ represent acoustic transfer functions between the loudspeaker 20 (e.g. loudspeaker 20 of a transducer arrangement) and the respective microphones $M_a$ and $M_b$. Loudspeaker 20 may also be implemented as multiple loudspeakers receiving the same or identical input signal(s). Corresponding signal paths are shown with dashed lines. Transfer functions $H_{E\_a}$ and $H_{E\_b}$ are to be understood as electrical transfer functions from two inputs to one output. These transfer functions may comprise previously mentioned signal conditioning functions like amplification, source impedance conversion, conversion between analog and discrete time domains as well as signal processing like filtering, compression and limiting. Furthermore, there may be at least one arithmetic operation (e.g. summation, subtraction, multiplication, division) between the two inputs or processed version of these inputs. The electrical transfer functions may thus comprise all signal conditioning and processing functions required for open and/or closed control loops as known in the art. Blocks $T_a$ and $T_b$ may provide reference signals that define respective control targets. Control targets may comprise signals for playback over the transducer arrangement or a null signal setting silence as the control target. Due to the generic nature of the signal flow of FIG. 33, transfer function blocks may be unused in certain control loop configurations or corresponding transfer functions may be identical (e.g. $H_{E\_a}=H_{E\_b}$).

Concerning previously mentioned control loop for loudspeaker linearization (compensation of nonlinearities), microphones $M_a$ and $M_b$ may sense sound at positions represented by microphones 101 and 102 in FIG. 32. Both microphones may receive an acoustic signal from one or more loudspeaker 20 through individual acoustic paths with transfer functions $H_{A\_a}$ and $H_{A\_b}$. Due to acoustic properties of the transducer arrangement, any ambient sound signal, including speech of a user of the transducer arrangement, received by those microphones, may be small compared to the loudspeaker signals. Blocks $T_a$ and $T_b$ may provide identical reference signals, for example a music signal that shall be played over the transducer arrangement. Transfer blocks $H_{E\_a}$ and $H_{E\_b}$ may calculate a difference or error signal from the respective microphone and reference inputs. Identical or individual transfer functions may be applied to the error signal within the respective transfer block before the signal is emitted on the respective outputs of the transfer blocks. If all microphones and transfer blocks are used as described, it results in a nested control loop topology with two loops sharing at least the loudspeaker(s) 20. If $T_a=T_b$ and $H_{E\_a}=H_{E\_b}$, the nested loops share everything but the acoustic transfer functions and the microphones. If either $H_{E\_a}$ or $H_{E\_b}$ equals zero, the result is a single control loop. Due to the microphones $M_a$ and $M_b$ receiving high signal levels from the loudspeaker(s) 20, the control loops may be closed loops if the electrical transfer functions $H_{E\_a}$ and $H_{E\_b}$ are nonzero. This can be understood as feedback control with a closed control loop.

Microphones at positions 103 and 104 may be applied in one or more parallel or nested control loops for active cancellation of ambient noise (ANC) and for compensation of loudspeaker nonlinearities. While microphone position 103 is close to the nozzle output 42 (e.g. within 5 mm from the nozzle output 42), microphone 104 is attached to the end of a microphone sound canal with an opening close to the nozzle output 42 (e.g. within 5 mm from the nozzle output 42). Microphone 104 thereby does remote sensing of a position similar to microphone 103 close to the external opening(s) 34 of the sound canal(s) 33. In case the transducer arrangement does not comprise a nozzle, like for example the transducer arrangements shown in FIGS. 5, the sound sensing positions for microphones 103 and 104 may be within 5 mm from at least one of the external open ends 34 of the sound canals 33. The microphone itself may be placed anywhere within the transducer arrangement. Both microphones pick up loudspeaker sound as well as ambient sound at representative levels for the sound that enters the ear canal of a user. Therefore, a control loop comprising at least one of these microphones and at least one loudspeaker 20 of the transducer arrangement can apply ambient noise cancellation and distortion cancellation at the same time. Once again, acoustic properties of the transducer arrangement control the effect of such control loops on playback signal and ambient sound.

With respect to FIG. 33, microphones $M_a$ and $M_b$ may correspond to microphones sensing sound at positions illustrated by microphones 103 and 104 with transfer functions $H_{A\_a}$ and $H_{A\_b}$ according to FIG. 33 between the loudspeaker(s) 20 and the respective microphone. In addition, these microphones may receive ambient sound. Both, ambient sound and sound from the loudspeaker(s) 20 may be at sound pressure levels representative for a position close to the ear canal entry 307 of a user. Remaining control loop setup may equal the loop setup options previously described for the case with predominant loudspeaker linearization. Target signals may either be any playback signal or a null signal for silence. Typically, only one of the microphones 103 and 104 may be used with either $H_{E\_a}$ or $H_{E\_b}$ equal to zero, resulting in a single control loop. Due to relatively strong feedback from the loudspeaker(s) 20 to the microphones, this can again be understood as closed loop providing feedback control.

Positions 105 (outer surface of sound steering unit 30 oriented towards the side of a user) and 106 (outer surface of sound steering unit 30 or rear chamber 35 oriented towards the mouth of the user) may be suited for predominant pickup of ambient sound also including speech of the user. These positions between the nozzle output 42 and any rear ventilation opening(s) 36 or rear ventilation duct 38 may further be optimized acoustically to get minimum SPL from loudspeaker playback at least within a frequency range of interest (e.g. human voice spectrum). Acoustic optimization regarding microphone positions includes positioning for best mutual cancellation of sound output by the nozzle 41 and by the rear ventilation as well as maximization of distance from these outputs. The latter will help to reduce loudspeaker coupling into the microphones especially for a higher frequency range, where sound from the nozzle output 42 and from the rear ventilation opening(s) 36 or rear ventilation duct 38 do not cancel well. Optimum positions depend on various factors and best positions within the described surface areas of the transducer arrangement may for example be evaluated by measurement of transfer functions $H_{A\_a}$ and $H_{A\_b}$ between the loudspeaker(s) 20 and the respective microphone position. Microphone positions 105 and 106 may be chosen at or close to nulls of the dipole formed by the nozzle output 42 and the rear ventilation opening 36 or rear ventilation duct 38. The position of the dipole null may be frequency-dependent. At least for a lower frequency range the dipole null may approximately fall into a region with equal distance from frontal and rear sound outputs.

Microphones at positions 105 and 106 may for example be utilized in control loops for active ambient noise cancellation (ANC). If the SPL of the signal radiated by the loudspeaker 20 is lower at the position of the microphones than at the target position for ANC, the control loop may be considered as open control loop providing feed forward control. The target position for ANC may be the ear canal entry 307 of the user. It should however be clear, that some feedback from the loudspeaker(s) 20 to the microphones will still exist. However, the open control loop may be designed such, that the feed forward paths from microphone inputs to loudspeaker output exhibit a higher absolute magnitude transfer function than the acoustic feedback paths from the loudspeaker 20 to the microphones. Hence, feed forward paths may have higher influence on sound at the ANC target position than feedback paths. This means that such an open control loop or feed forward control may predominantly cancel ambient noise with low impact on playback of any wanted signal.

Regarding the generic signal flow of FIG. 33, microphones $M_a$ and $M_b$ may sense sound at positions represented by microphones 105 and 106 in FIG. 32. Acoustic transfer functions $H_{A\_a}$ and $H_{A\_b}$ between the loudspeaker(s) 20 and the respective microphone may exhibit a magnitude transfer function below 0.5 or below −6 dB at least within a frequency region for which ANC is applied. No reference signals may be required from $T_a$ and $T_b$, hence both may output a zero signal. Alternatively, reference signals may still represent any wanted signal in order to further reduce influence of the control loops on wanted signal playback. Within a frequency region for which ANC is applied by the control loops electrical transfer functions $H_{E\_a}$ and $H_{E\_b}$ may be set such, that the complete transfer functions from the respective acoustic input signal of the microphone to the acoustic output signal of the loudspeaker(s) 20 at the nozzle output 42 approximates −1. Thus, ambient sound with approximately equal level and phase at the microphones and at the nozzle output 42 will be attenuated by the ANC signal from the loudspeaker(s) 20. In the feed forward ANC case, multiple forward paths from multiple microphones may be utilized in combination as supported by the generic signal flow of FIG. 33. It is also possible to provide feed forward ANC with a single microphone with either $H_{E\_a}$ or $H_{E\_b}$ set equal to zero.

The signal flow of FIG. 33 can easily be extended to any number of open or closed control loops including the loudspeaker(s) 20. Feed forward and feedback control according to any of the previously described examples may be combined as required for specific use cases. Thus, it is possible to provide loudspeaker linearization and ANC either in combination or individually.

Microphone locations 105 and 106 are furthermore suited for pickup of speech from a user of the open earphone. Speech pickup may for example be required for hands-free phone calls. Due to the previously described acoustic minimization of loudspeaker feedback towards those microphone positions, echoes of the loudspeaker signals through the microphones will be reduced. At the lower end of the frequency range supported by the transducer arrangement, mutual cancellation of sound radiated from the nozzle output 42 and from the ventilated rear chamber 35 may be most effective because the acoustic environment of the transducer arrangement has the lowest influence in that frequency region. If a lower frequency does not need acoustic echo cancellation, an adaptive filter, as typically applied in acoustic echo cancellers, may provide lower frequency resolution in this frequency range as would otherwise be the case. If the adaptive filter is implemented as Finite Impulse Response (FIR) filter, this means a reduced number of filter taps. In case the adaptive filter is implemented in the frequency domain, a lower resolution Fast Fourier Transform (FFT) is required.

Figure 34:
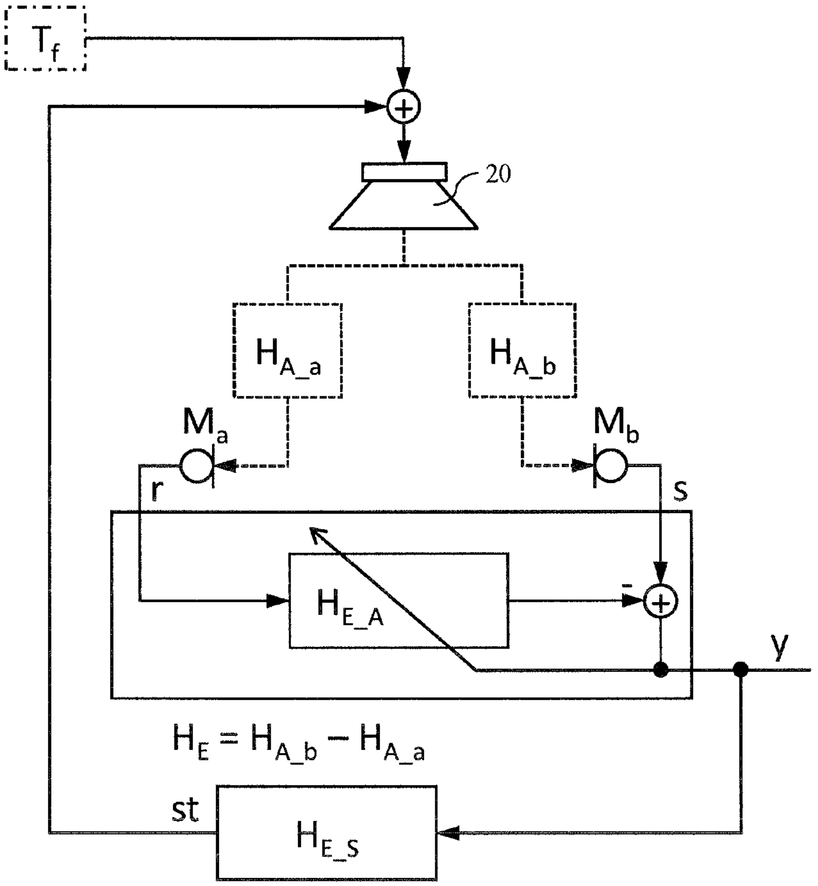

For further echo reduction, at least one acoustic echo canceller (AEC) may be applied. With reference to FIG. 34, such an AEC may comprise a fixed or adaptive filter element (e.g. $H_{E\_A}$ in FIG. 34). The filter element may for example provide an approximation of the acoustic transfer function ($H_{A\_b}$) from at least one loudspeaker 20 of the transducer arrangement to at least one speech pickup microphone ($M_b$) at positions 105 and/or 106 (FIG. 32) providing a speech signal s. The transfer function of the filter element $H_{E\_A}$ may also comprise compensation for an acoustic transfer function $H_{A\_a}$ between the at least one loudspeaker 20 and at least one reference microphone $M_a$. In this case $H_{E\_A}=H_{A\_b}/H_{A\_a}$. The transfer function $H_{E\_A}$ of the filter element may, however, be adaptive as known from state of the art acoustic echo cancellers. Adaption target may be best possible suppression of the loudspeaker signal in the speech mic signal s (minimize y if no speech present). An AEC reference signal r may be determined by at least one reference microphone ($M_a$). In case of multiple microphones providing a single signal (e.g. r btw. s in FIG. 34), these may, for example, be connected in parallel.

A reference signal r for the at least one AEC may be taken from at least one microphone $M_a$ sensing sound at locations represented by positions 101 or 102 in FIG. 32. The AEC reference signal r may be processed with the transfer function $H_{E\_A}$ and subsequently subtracted from the speech signal s for reduction of feedback between loudspeaker(s) 20 and speech pickup microphone(s) $M_b$. In this way, the AEC reference signal r does not only include signal components resulting from the linear part of the loudspeaker transfer function but also any nonlinear signal components produced by the loudspeaker 20. This allows for improved echo canceller performance in the presence of noise and distortion from the loudspeaker 20.

The loudspeaker(s) 20 may receive an input signal for playback, which may be the sum of multiple sources. Block $T_f$ may provide the voice signal from a telephone partner (far end voice) and/or any other content (e.g. music). A side-tone signal st may be provided, based on the AEC output y filtered with the electronic transfer function $H_{E\_S}$ in order to enhance the sound of a user's own voice. Additional input signals for the loudspeaker(s) 20 may originate from the previously described error control loops, which may share at least one microphone with the AEC signal flow. All microphones illustrated by FIG. 32 may be comprised in one or more of the signal flows previously described or described in the following.

For speech pickup, suppression of ambient noise may be desired in order to provide a clear voice of the user of the earphones without noise from the background. For this purpose, microphones sensing sound at positions 105 and 106 may be included in a microphone array in endfire orientation directed towards the mouth of the user. Endfire orientation means that both microphones are approximately placed on one line between the microphones and the mouth of the user with one microphone located further away from the mouth of the user. Microphone beamforming techniques like delay and sum beamforming or filter and sum beamforming, which are known in the art, may be applied to the endfire microphone array.

Furthermore, single microphones or microphone arrays on both sides of the head of a user may be utilized for improved ambient noise suppression in the speech signal. If signals from similar microphones or microphone arrays from similar positions close to the user's ear 3 are simply summed up, noise signals from the sides of the user will be attenuated. Additional delay and sum or filter and sum processing may allow for even better ambient noise suppression. The aforementioned placement of microphones on both sides of the user's head will automatically result from corresponding microphone placement on the transducer arrangements of both earphones.

In the following, several examples of transducer arrangements, their application in head- or earphones and methods for operation of transducer arrangements will be described.

Example 1: According to a first example, a transducer arrangement for head- or earphones comprises a sound steering unit 30, which comprises a frontal chamber 31 and at least one sound canal 33, each of the at least one sound canal 33 comprises at least one internal opening 32 towards the frontal chamber 31 as well as an external open end 34 for directing sound towards the outside of the transducer arrangement. The transducer arrangement further comprises a rear chamber 35 and at least one loudspeaker 20 arranged between the frontal chamber 31 and the rear chamber 35.

Example 2: The transducer arrangement of example 1, wherein the sound steering unit 30 comprises at least 3 sound canals 33 and a respective length of each of the at least 3 sound canals 33 is different from the length of all other of the at least 3 sound canals 33. Wherein the length of each respective sound canal 33 is the average length of the sound canal 33 between the at least one internal opening 32 and the respective external open end 34.

Example 3: The transducer arrangement of example 2, wherein the length of the respective sound canals 33 varies by more than +/−10% or more than +/−20% of the average length of all sound canals 33 of the sound steering unit 30.

Example 4: The transducer arrangement of any of the preceding examples, wherein the sound steering unit 30 comprises at least 3 internal openings 32 from at least one sound canal 33 towards the frontal chamber 31.

Example 5: The transducer arrangement of any of examples 2-4, wherein the internal openings 32 of all sound canals 33 of the sound steering unit 30 are arranged at different respective locations relative to both of the at least one loudspeaker 20 and the frontal chamber 31 and wherein the internal openings 32 of all sound canals 33 of the sound steering unit 30 are arranged within one plane in front of the at least one loudspeaker 20.

Example 6: The transducer arrangement of any of examples 2-5, wherein the internal openings 32 of all sound canals 33 of the sound steering unit 30 are arranged at different respective locations relative to both of the at least one loudspeaker 20 and the frontal chamber 31 and wherein the internal openings 32 of all sound canals 33 of the sound steering unit 30 are arranged at equal distance from the membrane of the at least one loudspeaker 20.

Example 7: The transducer arrangement of any of the preceding examples, wherein at least one of the sound canals 33 comprises a stub canal 37, that extends from an internal opening 32 of the sound canal 33 to a closed end of the stub canal 37 within the sound steering unit 30.

Example 8: The transducer arrangement of any of the preceding examples, wherein at least one of the sound canals 33 of the sound steering unit 30 comprises a stub canal 37, that extends from an internal opening 32 of the sound canal 33 to a closed end of the stub canal 37 within the sound steering unit 30. And the stub canal 37 has a tapered shape, such that a cross section area of the stub canal 37 decreases towards the closed end of the stub canal 37.

Example 9: The transducer arrangement of any of the preceding examples, wherein at least one of the sound canals 33 of the sound steering unit 30 comprises a stub canal 37, that extends from an internal opening 32 of the sound canal 33 to a closed end of the stub canal 37 within the sound steering unit 30. And the stub canal 37 has a length of one fourth, one sixth or one eighth of the length of one of the sound canals 33 of the sound steering unit 30.

Example 10: The transducer arrangement of any of the preceding examples, wherein at least one of the sound canals 33 of the sound steering unit 30 comprises a stub canal 37, that extends from an internal opening 32 of the sound canal 33 to a closed end of the stub canal 37 within the sound steering unit 30. And the stub canal 37 has a length that is a fraction of the length of one of the sound canals 33 of the sound steering unit 30, and wherein the fraction equals 1 divided by an even integer between 1 and 11.

Example 11: The transducer arrangement of any of the preceding examples, wherein each of the sound canals 33 of the sound steering unit 30 comprises a stub canal 37, that extends from an internal opening 32 of the sound canal 33 to a closed end of the stub canal 37 within the sound steering unit 30. And each stub canal 37 has a length that is a fraction of the length of one of the sound canals 33 of the sound steering unit 30, and wherein the fraction equals 1 divided by an even integer between 1 and 11.

Example 12: The transducer arrangement of any of the preceding examples, wherein a sum of the respective minimum cross section area of all sound canals 33 of the sound steering unit 30 between the at least one internal opening 32 and the external open end 34 of each respective sound canal 33 is more than 5 $mm^2$ or more than 10 $mm^2$.

Example 13: The transducer arrangement of any of the preceding examples, wherein an air volume within the frontal chamber 31 of the sound steering unit 30 is less than 2 times or less than 4 times the maximum possible air volume displacement of all loudspeakers 20 driving the sound steering unit 30.

Example 14: The transducer arrangement of any of the preceding examples, wherein a Helmholtz resonance frequency of the sound steering unit 30 is above 500 Hz or above 1 kHz.

Example 15: The transducer arrangement of any of the preceding examples, wherein an acoustic transfer function from the rear chamber 35 towards the outside of the transducer assembly approximates low-pass or attenuating high-shelve characteristics which is facilitated by at least one rear ventilation opening 36 within wall sections of the rear chamber 35, covered with acoustically resistive mesh.

Example 16: The transducer arrangement of any of the preceding examples, wherein an acoustic transfer function from the rear chamber 35 towards the outside of the transducer assembly approximates low-pass or attenuating high-shelve characteristics which is facilitated by a rear ventilation duct 38 attached to the rear chamber 35.

Example 17: The transducer arrangement of example 16, further comprising a support structure for holding the transducer assembly on the head and ear of a user, the support structure comprises a hollow section which is mechanically coupled to the rear chamber 35, wherein the rear ventilation duct 38 releases sound within the hollow section of the support structure.

Example 18: The transducer arrangement of example 16, further comprising a support structure which comprises an ear-hook 51, wherein the ear-hook 51 is at least partly hollow, and wherein the rear ventilation duct 38 releases sound within the hollow part of the ear-hook 51.

Example 19: The transducer arrangement of any of the preceding examples, where a resonance frequency of a Helmholtz resonance of the rear chamber 35 is within +/−15% or within +/−30% of a Helmholtz resonance frequency of the sound steering unit 30.

Example 20: The transducer arrangement of any of examples 2-19, where a cross section area of the at least 3 sound canals 33 varies between respective sound canals 33, wherein the cross section area decreases towards the sound canals 33 with minimum and maximum length respectively of the length variation range of all sound canals 33.

Example 21: The transducer arrangement of any of examples 2-20, where the length of respective sound canals 33 is distributed equidistant on a logarithmic scale.

Example 22: The transducer arrangement of any of the preceding examples, further comprising at least one direct radiating high frequency loudspeaker 21.

Example 23: The transducer arrangement of any of the preceding examples, where wall sections of the rear chamber 35 provide a support surface constructed and arranged to rest on the cheek of a user in front of the pinna 3 or more specifically the tragus 301.

Example 24: The transducer arrangement of any of the preceding examples, further arranged and constructed to be arranged or mounted on an ear 3 of a user, such that the at least one loudspeaker 20 is arranged in front of the tragus 301 and the sound steering unit 30 protrudes over the tragus 301 towards the ear canal entry 307.

Example 25: The transducer arrangement of any of the preceding examples, further arranged and constructed to be arranged on the ear 3 of a user, such that the sound steering unit 30 extends from a laterally most distant point of the whole transducer assembly with respect to the head of the user to a point close to the ear canal entry 307 of the user.

Example 26: The transducer arrangement of any of the preceding examples, where a cross section of the sound steering unit 30 comprises essentially two legs with an intermediate angle of 180°−α, wherein a first leg extends in front of the loudspeaker 20 and contains the frontal chamber 31, the internal openings 32 and parts of the respective sound canals 33, and the second leg comprises the remaining part of each respective sound canal 33 and external open ends 34.

Example 27: The transducer arrangement of example 26, where α is between 90° and 130°.

Example 28: The transducer arrangement of any of the preceding examples, where the nozzle 41 of the sound steering unit 30 ends above the ear canal entry 307, thereby keeping the ear canal entry 307 open for ambient sound and ventilation.

Example 29: The transducer arrangement of any of the preceding examples, where the external shape of the transducer arrangement comprises a main body 40 and a nozzle 41 protruding from the main body 40. The nozzle 41 comprises part of the sound steering unit 30 including a part of each respective sound canal 33 and respective external open ends 34, the latter directing sound to a nozzle output 42 of the nozzle 41. Sections of the nozzle 41 run within a distance of and side by side with sections of the main body 40, thereby creating a tragus gap 43 between the main body 40 and the nozzle 41, the tragus gap 43 providing free space which can accommodate the tragus 301 of an ear 3 of a user.

Example 30: The transducer arrangement of example 29, where an external tragus alignment section 44 is mechanically connected to the sound steering unit 30 or to the main body 40, the size and shape of the external tragus alignment section 44 controlling the width of the tragus gap 43 between the nozzle 41 and the external tragus alignment section 44.

Example 31: The transducer arrangement of example 30, where the size and shape of the external tragus alignment section 44 can be adapted by a user, by means of elastic covers attached to a rigid core of the tragus alignment section 44.

Example 32: The transducer arrangement of examples 29 to 31, where the nozzle 41 runs past the tragus 301 of the ear 3 from a position in front of the tragus 301 to a position close to the ear canal entry 307, when the transducer arrangement is arranged on the ear 3 of a user. The nozzle 41 thereby covers one continuous part of the tragus 301 when viewed from a lateral direction.

Example 33: The transducer arrangement of example 32, where the nozzle 41 of the sound steering unit 30 ends above the entry of the ear canal 307, thereby keeping the ear canal entry 307 open for ambient sound and ventilation.

Example 34: The transducer arrangement of examples 29 to 33, where a cross section area of the nozzle 41, orthogonal to the longitudinal axis of the nozzle 41, has an essentially oblong shape with a ratio wn/tn of more than wn/tn=2 or more than wn/tn=4, wherein wn is the longitudinal dimension and to the transversal dimension of the cross section area of the nozzle 41.

Example 35: The transducer arrangement of any of examples 29 to 34, where the nozzle 41 comprises a curved end section comprising the nozzle output 42, the curved end section constructed and arranged to be positioned above the ear canal entry 307 of the ear 3 of a user. Due to the curved end section, the nozzle 41 protrudes further towards the ear canal entry 307 at the middle of the width wn of the nozzle 41 than at the sides of the nozzle 41.

Example 36: The transducer arrangement of any of examples 29 to 35, further comprises at least one target position microphone 103, 104, receiving sound pressure from a position on the outside of the transducer arrangement within 5 mm from the nozzle output 42 or within 5 mm from at least one of the external open ends 34 of the sound canals 33 of the sound steering unit 30.

Example 37: The transducer arrangement of any of examples 29 to 36, further comprises at least one error microphone 101, 102, receiving sound pressure within the frontal chamber 31 or within the rear chamber 35.

Example 38: The transducer arrangement of any of examples 29 to 37, further comprises at least one ambient microphone 105, 106, receiving sound pressure from a position on an outer surface of the sound steering unit 30 oriented towards the side of the user or from a position on an outer surface of the sound steering unit 30 or of walls sections of the rear chamber 35 oriented towards the mouth of the user.

Example 39: The transducer arrangement of any of examples 29 to 38, where microphones 105 and 106 are positioned at or close to a null of a dipole formed by the nozzle output 42 and the rear ventilation opening 36 or rear ventilation duct 38.

Example 40: An earphone comprising the transducer arrangement of any of examples 29 to 39, the earphone further comprising at least one control loop, the control loop comprising at least one microphone 101, 102, 103, 104, 105, 106 and at least one of the at least one loudspeaker 20.

Example 41: An earphone comprising the transducer arrangement of any of examples 36 to 39, the earphone further comprising at least one control loop for active cancellation of ambient noise and for compensation of loudspeaker nonlinearities, the control loop comprises at least one of the at least one loudspeaker 20 and at least one of the at least one target position microphone 103, 104.

Example 42: An earphone comprising the transducer arrangement of any of examples 37 to 39, the earphone further comprising at least one control loop for compensation of loudspeaker nonlinearities, the control loop comprising at least one of the at least one loudspeaker 20 and at least one of the at least one error microphone 101, 102.

Example 43: An earphone comprising the transducer arrangement of any of examples 38 to 39, the earphone further comprising at least one control loop for cancellation of ambient noise, the control loop comprises at least one of the at least one loudspeaker 20 and at least one of the at least one ambient microphone 105, 106.

Example 44: An earphone comprising the transducer arrangement of any of examples 29 to 39, the earphone further comprises a support structure which provides a lateral clamping force to the main body 40, the clamping force clamps main body 40 laterally against the cheek of a user. The tragus 301 is positioned within the tragus gap 43, which keeps the tragus 301 free of lateral forces from the support structure.

Example 45: The earphone of example 44, where the support structure comprises an ear-hook 51, the ear-hook 51 formed in substantial U-shape, such that it encircles an upper part of the ear 3 of a user.

Example 46: The earphone of example 45, where the support structure is attached to the transducer arrangement by means of a moveable joint, which allows rotational movement of the support structure around a pivot point or pivot axis. At least one of the width we and the height he of the ear-hook 51 with reference to a point in the tragus gap 34 of the transducer assembly is varied over the course of the rotational movement of the ear-hook 51, such that the size of the ear-hook 51 with reference to the tragus gap 34 can be adapted to a range of ear-sizes.

Example 47: The earphone of any of examples 44 to 46, wherein the main body 40 comprises an at least partly cylindrical shape and the support structure is mounted to the main body 40 by means of an at least semi-circular clamp 50, which at least partly encircles the main body 40 and allows rotational movement of the clamp 50 around the main body 40.

Example 48: A method for providing sound to an open ear 3 of a user, the method comprises operating at least one loudspeaker 20, wherein the at least one loudspeaker 20 is comprised within any one of the transducer arrangements of examples 1 to 39.

Example 49: The method of example 48, further comprising supplying an electric signal to the at least one loudspeaker 20, wherein the electric signal comprises at least one component derived from the output signal of a microphone 101, 102, 103, 104, 105, 106, which receives sound radiated by the at least one loudspeaker 20.

Example 50: The transducer arrangement of example 1, wherein at least wall sections of the rear chamber 35 and wall sections of the sound steering unit 30 form a main body 40 with a protruding nozzle 41. The main body 40 comprises a support surface arranged and constructed to rest on the cheek of a user directly in front of at least part of the ear 3.

Example 51: The transducer arrangement of example 50, wherein the nozzle 41 comprises part of the sound steering unit 30 with at least part of each of the at least one sound canal 33 and respective external open ends 34, directing sound from the at least one loudspeaker 20 via a nozzle output 42 of the nozzle 41 to the outside of the transducer arrangement. And wherein the nozzle output 42 is located laterally directly adjacent to the ear canal entry 307 of a user, when the transducer arrangement is arranged on the ear 3 of the user.

Example 52: The transducer arrangement of any of examples 50 or 51, wherein wall sections of the nozzle 41 run side by side with wall sections of the main body 40, thereby creating a tragus gap 43 between the main body 40 and the nozzle 41, the tragus gap 43 providing free space for the tragus 301 of the ear 3 of the user.

Example 53: The transducer arrangement of example 52, wherein the tragus gap 43 keeps at least the lateral extremes of the tragus 301 free of lateral forces when the main body 40 is clamped laterally against the cheek of a user.

Example 54: The transducer arrangement of any of examples 52 or 53, wherein the tragus gap 43 has a width dt between 4 mm and 8 mm within a region where the tragus 301 of a user can be expected when the loudspeaker arrangement is arranged on the ear 3 of a user.

Example 55: The transducer arrangement of examples 50 to 54, wherein the nozzle 41 comprises part of the frontal chamber 31 and at least two sound canals 33 including the respective internal opening 32 and external open end 34.

Example 56: The transducer arrangement of examples 50 to 55, wherein the nozzle 41 is arranged and constructed to protrude over the tragus 301 and align with an inner part of the tragus 301 oriented towards the concha 304 or ear canal entry 307.

Example 57: The transducer arrangement of any of examples 50 to 56, further arranged and constructed to be arranged on an ear 3 of a user, such that the support surface of the main body 40 is arranged in front of the ear 3 and the nozzle 41 protrudes over the tragus 301 and into a cavity of the ear 3.

Example 58: The transducer arrangement of any of examples 50 to 57, wherein the nozzle 41 protrudes over the tragus 301 from a position in front of the ear 3 to a position laterally directly adjacent to the ear canal entry 307, when the transducer arrangement is arranged on the ear 3 of a user. And when viewed from a lateral direction, the nozzle 41 visually covers a continuous part at least of the tragus 301 between the anterior notch 302 and the intertragal notch 303.

Example 59: The transducer arrangement of any of examples 50 to 58, wherein most of the ear 3 and the ear canal entry 307 are kept open for ambient sound and ventilation when the transducer arrangement is arranged on the ear 3 of a user.

Example 60: The transducer arrangement of any of examples 50 to 59, wherein most of the concha 304 can be viewed from a lateral direction when the transducer arrangement is arranged on the ear 3 of a user.

Example 61: The transducer arrangement of any of examples 2 to 60, wherein the main body 40 is smaller than the ear 3 of a user at least in a vertical dimension. And the main body 40 is positioned in front of the ear 3 and close to the tragus 301 when the transducer arrangement is arranged on the ear 3 of a user.

Example 62: The transducer arrangement of any of examples 2 to 61, wherein the nozzle 41 runs in a distance to the lateral extremes of the tragus 301 when the transducer arrangement is arranged on the ear 3 of a user.

Example 63: The transducer arrangement of any of examples 51 to 62, wherein a perpendicular distance dh between a plane containing the support surface of the main body 40 and the nozzle output 42 of the nozzle 41, is between 1 mm and 8 mm and the nozzle output 42 is located below the plane.

Example 64: The transducer arrangement of any of examples 50 to 63, wherein a cross section area of the nozzle 41, orthogonal to the longitudinal axis of the nozzle 41, has an essentially oblong shape with a ratio wn/tn of more than wn/tn=2 or more than wn/tn=4, wherein wn is the longitudinal dimension and to the transversal dimension of the cross section area of the nozzle 41.

Example 65: The transducer arrangement of any of examples 50 to 64, wherein the external shape of the nozzle 41 provides an inner alignment surface, constructed and arranged to align the nozzle 41 with an inner part of the tragus 301 oriented towards the concha 304 or the ear canal entry 307, such that the nozzle output 42 is positioned laterally directly adjacent to the ear canal entry 307.

Example 66: The transducer arrangement of any of example 65, further comprising an external tragus alignment section 44 with an external alignment surface, constructed and arranged to align to an external part of the tragus 301 that is oriented towards the main body 40 of the transducer arrangement. And wherein the tragus gap 43 between the inner alignment surface and the external alignment surface provides free space for the tragus 301 of a user.

Example 67: The transducer arrangement of any of examples 50 to 66, wherein a width wn of the nozzle 41 is between 5 mm and 15 mm or between 8 mm and 12 mm at least at the intersection of the nozzle 41 with a plane comprising the support surface of the main body 40.

Example 68: The transducer arrangement of any of examples 50 to 67, wherein the nozzle 41 comprises either a rigid material, an elastic material or a rigid material and an elastic material.

Example 69: The transducer arrangement of any of examples 50 to 68, wherein the nozzle 41 comprises a first part and a second part. And the second part is detachable from the first part.

Example 70: The transducer arrangement of example 69, wherein the second part of the nozzle 41 comprises all of the at least one sound canal 33 and the respective internal opening 32 and external open end 34 of each sound canal 33.

Example 71: The transducer arrangement of any of examples 50 to 70, further arranged and constructed to be arranged on an ear 3 of a user, such that the at least one loudspeaker 20 is arranged in front of at least the tragus 301 and the sound steering unit 30 protrudes over the tragus 301 towards the ear canal entry 307.

Example 72: The transducer arrangement of any of examples 50 to 71, wherein the frontal side of the loudspeaker 20 is oriented towards the frontal chamber 31 and radiates sound towards a lateral direction away from the head of a user, when the transducer arrangement is arranged on the ear 3 of the user.

Example 73: The transducer arrangement of any of examples 51 to 72, wherein the main direction of sound radiation from the frontal side of the loudspeaker 20 is approximately inverse to the main direction of sound radiation at the nozzle output 42.

Example 74: The transducer arrangement of any of examples 51 to 73, wherein the nozzle output 42 supplies the complete frequency range supported by the transducer assembly as airborne sound to the ear canal entry 307.

Example 75: The transducer arrangement of any of examples 50 to 74, wherein wall sections of the rear chamber 35 constitute the support surface of the main body 40.

Example 76: The transducer arrangement of any of examples 50 to 75, wherein the frontal chamber 31 is located laterally more distant from the head of a user than the rear chamber 35 when the transducer arrangement is arranged on the ear 3 of a user. And the sound steering unit 30 extends from a laterally most distant point of the transducer assembly with respect to the head of the user to a point close to the ear canal entry 307 of the user.

Example 77: The transducer arrangement of any of examples 51 to 76, wherein the nozzle 41 comprises a curved end section comprising the nozzle output 42 constructed and arranged to be positioned laterally directly adjacent to the ear canal entry 307 of the ear 3 of a user. And wherein the nozzle 41 protrudes further towards the ear canal entry 307 at the middle of the width wn of the nozzle 41 than at the sides of the nozzle 41.

Example 78: The transducer arrangement of any of examples 50 to 77, wherein a sum of the respective minimum cross section area of all sound canals 33 of the sound steering unit 30 between the at least one internal opening 32 and the external open end 34 of each respective sound canal 33 is more than 5 $mm^2$ or more than 10 $mm^2$. An/or an air volume within the frontal chamber 31 of the sound steering unit 30 is less than two times or less than four times the maximum possible air volume displacement of all loudspeakers 20 arranged between the frontal chamber 31 and the rear chamber 35. And/or Helmholtz resonance frequency of the sound steering unit 30 is above 500 Hz or above 1 kHz.

Example 79: The transducer arrangement of any of examples 50 to 78, wherein an acoustic transfer function from the rear chamber 35 towards the outside of the transducer assembly approximates low-pass or attenuating high-shelve characteristics which is facilitated by at least one rear ventilation opening 36 within wall sections of the rear chamber 35, covered with acoustically resistive mesh. Or by a rear ventilation duct 38 in fluid communication with the rear chamber 35 and the outside of the transducer arrangement.

Example 80: The transducer arrangement of any of examples 50 to 54, wherein the at least one sound canal 33 comprises a common wall section with the frontal chamber 31, the common wall section separates at least part of the at least one sound canal 33 from the frontal chamber 31.

Example 81: The transducer arrangement of any of examples 50 to 80, wherein the sound steering unit 30 comprises at least three sound canals 33. A respective length lc of each of the at least three sound canals 33 is different from the length lc of all other of the at least three sound canals 33. The length lc of each respective sound canal 33 is the average length of the sound canal 33 between the at least one internal opening 32 and the external open end 34 of the respective sound canal 33.

Example 82: The transducer arrangement of example 81, wherein the length lc of the respective sound canals 33 varies over a range of more than +/−10% or more than +/−20% of the average length of all sound canals 33 of the sound steering unit 30.

Example 83: The transducer arrangement of any of examples 50 to 82, wherein the sound steering unit 30 comprises at least three internal openings 32 from at least one sound canal 33 towards the frontal chamber 31.

Example 84: The transducer arrangement of any of examples 81 to 83, wherein the respective internal openings 32 of all sound canals 33 of the sound steering unit 30 are arranged at different locations relative to both of the at least one loudspeaker 20 and the frontal chamber 31. And wherein the internal openings 32 of all sound canals 33 of the sound steering unit 30 are arranged within one plane in front of the at least one loudspeaker 20 and/or arranged at equal distance from the membrane of the at least one loudspeaker 20.

Example 85: The transducer arrangement of any of examples 50 to 84, wherein at least one of the sound canals 33 of the sound steering unit 30 comprises a stub canal 37, that extends from an internal opening 32 of the sound canal 33 to a closed end of the stub canal 37 within the sound steering unit 30. The stub canal 37 has a tapered shape, such that a cross section area of the stub canal 37 decreases towards the closed end of the stub canal 37. And/or a length of one fourth, one sixth or one eighth of the length of one of the sound canals 33 of the sound steering unit 30. And/or a length that is a fraction of the length of one of the sound canals 33 of the sound steering unit 30, and wherein the fraction equals 1 divided by an even integer between 1 and 11.

Example 86: The transducer arrangement of any of examples 51 to 85, further comprising at least one microphone 101, 102, 103, 104, 105, 106, each of the at least one microphone 101, 102, 103, 104, 105, 106 receiving sound pressure from either a position within the frontal chamber 31 or a position within the rear chamber 35 or a position within 5 mm distance from the nozzle output 42 or a position within 5 mm distance from at least one of the external open ends 34 of the sound canals 33 of the sound steering unit 30 or a position on an outer surface of the sound steering unit 30 oriented towards the side of the user or a position on an outer surface of the sound steering unit 30 oriented towards the mouth of the user or a position on an outer surface of wall sections of the rear chamber 35 oriented towards the mouth of the user. And wherein at least one of the at least one microphone 101, 102, 103, 104, 105, 106 is electrically coupled to at least one of the at least one loudspeaker 20.

Example 87: The transducer arrangement of any of examples 51 to 85, further comprising at least one error microphone 101, 102 receiving sound pressure from within the frontal chamber 31 or from within the rear chamber 35, the error microphone 101, 102 is electrically coupled to the at least one loudspeaker 20. And/or at least one target position microphone 103, 104 receiving sound pressure from a position on the outside of the transducer arrangement within 5 mm from the nozzle output 42 or within 5 mm from at least one of the external open ends 34 of the sound canals 33 of the sound steering unit 30, the target position microphone 103, 104 is electrically coupled to the at least one loudspeaker 20. And/or at least one ambient microphone 105, 106 receiving sound pressure from a position on an outer surface of the sound steering unit 30 oriented towards the side of the user or from a position on an outer surface of the sound steering unit 30 or of walls sections of the rear chamber 35 oriented towards the mouth of the user, the ambient microphone 105, 106 is electrically coupled to the at least one loudspeaker 20. And/or at least one ambient microphone 105, 106 receiving sound pressure from a position on an outer surface of the sound steering unit 30 oriented towards the side of the user or from a position on an outer surface of the sound steering unit 30 or on wall sections of the rear chamber 35 oriented towards the mouth of the user, wherein the ambient microphone 105, 106 is positioned at or close to a null of a dipole formed by the nozzle output 42 and the rear ventilation opening 36 or rear ventilation duct 38, the ambient microphone 105, 106 is electrically coupled to the at least one loudspeaker 20.

Example 88: An earphone comprising the transducer arrangement of any of examples 52 to 87.

Example 89: The earphone of example 88, further comprising a support structure which supplies a lateral clamping force to the main body 40, the support structure arranged and constructed to clamp the main body 40 laterally against the cheek of a user. And when the earphone is arranged on the ear 3 of a user, the tragus 301 is positioned within the tragus gap 43, which keeps the tragus 301 free of the lateral clamping force of the support structure.

Example 90: The earphone of example 89, wherein the support structure comprises an ear-hook 51, the ear-hook 51 formed in substantial U-shape, such that it encircles an upper part of the ear 3 of a user when the earphone is arranged on the ear 3 of the user.

Example 91: The earphone of example 90, wherein the ear-hook 51 is flexible and exhibits a direction-dependent restoring force during elastic deflections. And the restoring force is higher for lateral deflections with respect to a user wearing the earphone than for deflection in other directions.

Example 92: The earphone of examples 89 to 91, wherein the support structure is attached to the transducer arrangement by means of a moveable joint, which allows rotational movement of the support structure around a pivot point or pivot axis. And wherein at least one of a width we and a height he of the ear-hook 51 with reference to a point in the tragus gap 34 of the transducer assembly is varied over the course of the rotational movement of the ear-hook 51, such that the size of the ear-hook 51 with respect to the tragus gap 34 can be adapted to a range of ear-sizes.

Example 93: The earphone of any of examples 89 to 92, wherein the main body 40 comprises an at least partly cylindrical shape. And wherein the support structure is mounted to the main body 40 by means of an at least semi-circular clamp 50, which at least partly encircles the main body 40 and allows rotational movement of the clamp 50 around the main body 40.

Example 94: The earphone of any of examples 88 to 93, further comprising at least one control loop, the control loop comprising at least one microphone 101, 102, 103, 104, 105, 106 and at least one of the at least one loudspeaker 20. And wherein the at least one microphone 101, 102, 103, 104, 105, 106 is electrically and acoustically coupled to the at least one loudspeaker 20.

Example 95: A method for providing sound to an open ear 3 of a user, the method comprises operating at least one loudspeaker 20, wherein the at least one loudspeaker 20 is comprised within any one of the transducer arrangements of examples 50 to 94.

Example 96: The method of example 95, further comprising supplying an electric signal to the at least one loudspeaker 20, wherein the electric signal comprises at least one component derived from the output signal of a microphone 101, 102, 103, 104, 105, 106, which receives sound radiated by the at least one loudspeaker 20.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A transducer arrangement for head-or earphones, the transducer arrangement comprising:

a sound steering unit comprising a frontal chamber and at least one sound canal, each of the at least one sound canal comprising at least one internal opening towards the frontal chamber and an external open end for directing sound towards an outside of the transducer arrangement;

a rear chamber; and at least one loudspeaker arranged between the frontal chamber and the rear chamber; wherein wall sections of the rear chamber and wall sections of the sound steering unit form a main body with a protruding nozzle and the main body comprises a support surface arranged and constructed to rest directly in front of at least part of an ear of a user; and wherein at least one of:

the protruding nozzle ends below the support surface of the main body;

a perpendicular distance between a plane comprising the support surface of the main body and an end of the protruding nozzle, is between 1 mm and 8 mm and the protruding nozzle ends below the plane;

a cross-section area of the protruding nozzle, orthogonal to a longitudinal axis of the protruding nozzle, has an essentially oblong shape with a ratio of wn/tn of more than wn/tn=2 or more than wn/tn=4, wherein wn is a longitudinal dimension and tn is a transversal dimension of the cross-section area of the protruding nozzle; or a width of the protruding nozzle is between 5 mm and 15 mm or between 8 mm and 12 mm at an intersection of the protruding nozzle with a plane comprising the support surface of the main body.

2. The transducer arrangement of claim 1, wherein the protruding nozzle comprises part of the sound steering unit with at least part of each of the at least one sound canal and respective external open ends directing sound from the at least one loudspeaker via a nozzle output of the protruding nozzle to an outside of the transducer arrangement; and wherein the nozzle output is located laterally adjacent to an ear canal entry of a user, when the transducer arrangement is arranged on the ear of the user.

3. The transducer arrangement of claim 1, wherein wall sections of the protruding nozzle run side by side with wall sections of the main body, thereby creating a tragus gap between the main body and the protruding nozzle, the tragus gap providing a free space for a tragus of the ear of the user.

4. The transducer arrangement of claim 3, wherein the tragus gap has a width between 4 mm and 8 mm within a region where the tragus of the user can be expected, when the transducer arrangement is arranged on the ear of the user.

5. The transducer arrangement of claim 1, wherein the protruding nozzle comprises part of the frontal chamber and at least two sound canals including a respective internal opening and an external open end.

6. The transducer arrangement of claim 1, wherein the protruding nozzle is arranged and constructed to protrude over a tragus and align with an inner part of the tragus oriented towards a concha or an ear canal entry.

7. The transducer arrangement of claim 1, wherein an external shape of the protruding nozzle provides an inner alignment surface constructed and arranged to align the protruding nozzle with an inner part of the tragus oriented towards a concha or an ear canal entry.

8. The transducer arrangement of claim 7, further comprising an external tragus alignment section with an external alignment surface constructed and arranged to align to an external part of the tragus that is oriented towards the main body of the transducer arrangement; and wherein a tragus gap between an inner alignment surface and an external alignment surface provides free space for the tragus of a user.

9. The transducer arrangement of claim 1, wherein at least part of the protruding nozzle comprises an elastic material.

10. The transducer arrangement of claim 1, wherein the protruding nozzle comprises a first part and a second part; and the second part is detachable from the first part.

11. The transducer arrangement of claim 10, wherein the second part of the protruding nozzle comprises all of the at least one sound canal and a respective internal opening and an external open end of each sound canal.

12. The transducer arrangement of claim 1, further arranged and constructed to be arranged on an ear of a user, such that the at least one loudspeaker is arranged directly in front of at least a tragus and the sound steering unit protrudes over the tragus towards an ear canal entry.

13. The transducer arrangement of claim 1, wherein the protruding nozzle comprises a curved end section comprising a nozzle output, the nozzle output directing sound from an external open end of the at least one sound canal to an outside of the transducer arrangement; the nozzle output is constructed and arranged to be positioned laterally adjacent to an ear canal entry of an ear of a user; and wherein the protruding nozzle protrudes further towards the ear canal entry at a middle of a width of the protruding nozzle than at sides of the protruding nozzle.

14. The transducer arrangement of claim 1, wherein a thickness of a wall section of the frontal chamber separates at least part of the at least one sound canal from the frontal chamber.

15. The transducer arrangement of claim 1, further comprising at least one microphone, each of the at least one microphone receiving sound pressure from a position within 5 mm distance from the external open end of at least one of the at least one sound canal of the sound steering unit.

16. An earphone comprising a transducer arrangement, the transducer arrangement comprising:

a sound steering unit, comprising a frontal chamber and at least one sound canal, each of the at least one sound canal comprising at least one internal opening towards the frontal chamber and an external open end for directing sound towards an outside of the transducer arrangement; a rear chamber; and at least one loudspeaker arranged between the frontal chamber and the rear chamber; wherein at least wall sections of the rear chamber and wall sections of the sound steering unit form a main body with a protruding nozzle; and the main body comprises a support surface arranged and constructed to rest directly in front of at least part of an ear of a user; wherein the earphone further comprises a support structure comprising an ear-hook, the ear-hook formed in a substantial U-shape, such that the ear-hook encircles an upper part of an ear of a user when the earphone is arranged on the ear of the user; and wherein at least one of:

the ear-hook is flexible and exhibits a direction-dependent restoring force during elastic deflection and the direction-dependent restoring force is higher for lateral deflection with respect to the user wearing the earphone than for deflection in at least one other direction;

the support structure is attached to the transducer arrangement by a moveable joint, which allows rotational movement of the support structure around a pivot point or pivot axis, and at least one of a width we and a height he of the ear-hook with respect to a reference point between the main body and the protruding nozzle of the transducer arrangement is varied over a course of rotational movement of the ear-hook, such that a size of the ear-hook with respect to the reference point can be adapted to fit a range of ear-sizes; or the main body comprises an at least partly cylindrical shape, and the support structure is mounted to the main body by means of an at least semi-circular clamp, which at least partly encircles the main body and allows rotational movement of the at least semi-circular clamp around the main body.

17. The earphone of claim 16, further comprising at least one feedback control loop, the at least one feedback control loop comprising at least one feedback microphone and at least one of the at least one loudspeaker.

18. A method for providing sound to for an open ear of a user, the method comprising the steps of:

operating at least one loudspeaker;

guiding sound from one side of the at least one loudspeaker by a sound steering unit, the sound steering unit comprising a frontal chamber and at least one sound canal with an external open end arranged and constructed to emit sound towards an ear-canal entry;

receiving sound from another side of the at least one loudspeaker within a rear chamber and releasing at least part of the sound in the rear chamber to an outside of the rear chamber; and providing a support surface on at least part of the rear chamber, the support surface arranged and constructed to rest directly in front of at least part of an open ear; wherein operating the at least one loudspeaker comprises supplying an electric signal to the at least one loudspeaker; and the electric signal comprises at least one signal-component derived from an output-signal of a microphone, which receives sound radiated by the at least one loudspeaker.

19. The method of claim 18, further comprising the step of:

guiding sound through a sound canal comprising an internal opening towards an acoustic input of the microphone and an external opening towards an outside of the sound steering unit.

20. The method of claim 18, wherein a nonlinearity of the at least one loudspeaker is at least partly compensated by the signal-component derived from the output-signal of the microphone.

21. The method of claim 18, wherein the microphone receives sound pressure from a position within a 5 mm distance from the external open end of at least one of the at least one sound canal of the sound steering unit.

22. A transducer arrangement for head-or earphones, the transducer arrangement comprising:

a sound steering unit comprising a frontal chamber and at least one sound canal, each of the at least one sound canal comprising at least one internal opening towards the frontal chamber and an external open end for directing sound towards an outside of the transducer arrangement;

a rear chamber; and at least one loudspeaker arranged between the frontal chamber and the rear chamber; wherein wall sections of the rear chamber and wall sections of the sound steering unit form a main body with a protruding nozzle and the main body comprises a support surface arranged and constructed to rest directly in front of at least part of an ear of a user; and wherein wall sections of the protruding nozzle run side by side with wall sections of the main body, thereby creating a tragus gap between the main body and the protruding nozzle, the tragus gap providing a free space for the tragus of an ear of a user and positional guidance for the transducer arrangement on the tragus.

23. The transducer arrangement of claim 22, wherein the tragus gap has a width between 4 mm and 8 mm within a region where the tragus of the user can be expected, when the transducer arrangement is arranged on the ear of the user.

24. The transducer arrangement of claim 22, wherein an external shape of the protruding nozzle provides an inner alignment surface constructed and arranged to align the protruding nozzle with an inner part of the tragus oriented towards a concha or an ear canal entry.

25. The transducer arrangement of claim 22, further comprising an external tragus alignment section with an external alignment surface constructed and arranged to align to an external part of the tragus that is oriented towards the main body of the transducer arrangement.

26. A transducer arrangement for head-or earphones, the transducer arrangement comprising:

a sound steering unit comprising a frontal chamber and at least one sound canal, each of the at least one sound canal comprising at least one internal opening towards the frontal chamber and an external open end for directing sound towards an outside of the transducer arrangement;

a rear chamber; and at least one loudspeaker arranged between the frontal chamber and the rear chamber; wherein wall sections of the rear chamber and wall sections of the sound steering unit form a main body with a protruding nozzle and the main body comprises a support surface arranged and constructed to rest directly in front of at least part of an ear of a user; and wherein the protruding nozzle comprises a first part and a second part; and the second part is detachable from the first part and is at least partly divided into multiple sound canals.

27. The transducer arrangement of claim 26, wherein at least part of the protruding nozzle comprises an elastic material.

28. A transducer arrangement for head-or earphones, the transducer arrangement comprising:

a sound steering unit comprising a frontal chamber and at least one sound canal, each of the at least one sound canal comprising at least one internal opening towards the frontal chamber and an external open end for directing sound towards an outside of the transducer arrangement;

a rear chamber; and at least one loudspeaker arranged between the frontal chamber and the rear chamber; wherein wall sections of the rear chamber and wall sections of the sound steering unit form a main body with a protruding nozzle and the main body comprises a support surface arranged and constructed to rest directly in front of at least part of an ear of a user; and wherein at least one of:

a sum of the respective minimum cross section area of all sound canals of the sound steering unit between at least one internal opening and an external open end of each respective sound canal is more than 5 $mm^2$ or more than 10 $mm^2$;

a Helmholtz resonance frequency of the sound steering unit is above 500 Hz or above 1 kHz; or the sound steering unit comprises at least 3 sound canals, a respective length of each of the at least 3 sound canals is different from a length of all other of the at least 3 sound canals, and the length of each respective sound canal is an average length of the respective sound canal between at least one internal opening and the external open end of the respective sound canal.

29. The transducer arrangement of claim 28, wherein the respective length of at least 3 sound canals of the sound steering unit varies over a range of more than +/−10% or more than +/−20% of the average length of all sound canals of the sound steering unit.

30. A transducer arrangement for head-or earphones, the transducer arrangement comprising:

a sound steering unit comprising a frontal chamber and at least 3 sound canals, each of the at least 3 sound canals comprising at least one internal opening towards the frontal chamber and an external open end for directing sound towards an outside of the transducer arrangement;

a rear chamber; and at least one loudspeaker arranged between the frontal chamber and the rear chamber; wherein wall sections of the rear chamber and wall sections of the sound steering unit form a main body with a protruding nozzle and the main body comprises a support surface arranged and constructed to rest directly in front of at least part of an ear of a user; and wherein respective internal openings of all sound canals of the sound steering unit are arranged at different locations relative to both of the at least one loudspeaker and the frontal chamber; and wherein the respective internal openings of all sound canals of the sound steering unit are at least one of:

arranged within one plane in front of the at least one loudspeaker;

arranged at an equal distance from a membrane of the at least one loudspeaker;

comprised in wall sections of the frontal chamber that are essentially perpendicular to the main direction of sound radiation of the at least one loudspeaker; or open towards a direction perpendicular to a longitudinal axis of the respective sound canal at least in a region of the internal opening of the sound canal.

31. A transducer arrangement for head-or earphones, the transducer arrangement comprising:

a sound steering unit comprising a frontal chamber and at least one sound canal, each of the at least one sound canal comprising at least one internal opening towards the frontal chamber and an external open end for directing sound towards an outside of the transducer arrangement; a rear chamber; and at least one loudspeaker arranged between the frontal chamber and the rear chamber; wherein wall sections of the rear chamber and wall sections of the sound steering unit form a main body with a protruding nozzle and the main body comprises a support surface arranged and constructed to rest directly in front of at least part of an ear of a user; and wherein the transducer arrangement further comprises at least one microphone receiving sound pressure from a position on an outside of the protruding nozzle within 5 mm distance from an external open end of at least one of the at least one sound canal of the sound steering unit.

32. The transducer arrangement of claim 31, wherein the microphone receives sound through a sound canal comprising an internal opening towards an acoustic input of the microphone and an external opening towards an outside of the transducer arrangement.

* * * * *